(12) United States Patent
Asauchi

(10) Patent No.: US 7,013,410 B2
(45) Date of Patent: Mar. 14, 2006

(54) USER SUPPORT

(75) Inventor: Noboru Asauchi, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 578 days.

(21) Appl. No.: 09/962,839

(22) Filed: Sep. 24, 2001

(65) Prior Publication Data

US 2002/0093525 A1 Jul. 18, 2002

(30) Foreign Application Priority Data

Sep. 27, 2000 (JP) ............................. 2000-293434

(51) Int. Cl.
*G06F 11/00* (2006.01)
(52) U.S. Cl. .............................. 714/46; 714/57; 714/44
(58) Field of Classification Search ................. 714/46, 714/4, 45, 57, 44
See application file for complete search history.

(56) References Cited

U.S. PATENT DOCUMENTS

| | | | |
|---|---|---|---|
| 5,365,310 A | | 11/1994 | Jenkins et al. |
| 5,727,135 A | | 3/1998 | Webb et al. |
| 6,029,258 A | * | 2/2000 | Ahmad ..................... 714/46 |
| 6,205,579 B1 | * | 3/2001 | Southgate ................. 717/173 |
| 6,263,457 B1 | * | 7/2001 | Anderson et al. .......... 714/38 |
| 6,298,457 B1 | * | 10/2001 | Rachlin et al. ............. 714/49 |
| 6,400,462 B1 | * | 6/2002 | Hille ....................... 358/1.14 |
| 6,553,507 B1 | * | 4/2003 | Cohen ......................... 714/4 |
| 6,651,190 B1 | * | 11/2003 | Worley et al. .............. 714/43 |
| 6,665,425 B1 | * | 12/2003 | Sampath et al. .......... 382/112 |
| 6,757,837 B1 | * | 6/2004 | Platt et al. ................. 714/4 |
| 6,892,317 B1 | * | 5/2005 | Sampath et al. ............ 714/4 |
| 2002/0053045 A1 | * | 5/2002 | Gillenwater et al. ....... 714/38 |

FOREIGN PATENT DOCUMENTS

| | | |
|---|---|---|
| EP | 0843230 | 5/1998 |
| EP | 0903889 | 3/1999 |
| JP | 09-030091 | 2/1997 |
| JP | 11-305606 | 11/1997 |
| JP | 11-110165 | 4/1999 |
| JP | 11-305606 A | 5/1999 |
| JP | 2001-142983 A | 5/2001 |
| JP | 2001-142984 A | 5/2001 |
| JP | 2001-344203 A | 12/2001 |
| JP | 2002-83077 A | 3/2002 |

OTHER PUBLICATIONS

Larsen, A. K., "The Next Web Wave: Network Management" Data Communications, McGraw Hill, New York, US, vol. 25, No. 1, 1996 pp. 31-*32, 34 Doc No. XP000545237 ISSN: 0363-6399.

Jander, M., "Welcome to the Revolution" Data Communications, McGraw Hill, New York US, vol. 25, No. 16, Nov. 21, 1996, pp. 39-42, 44, 46, 48, 50, 52-53, Doc No. XP000633488 ISSN: 0363-6399.

* cited by examiner

*Primary Examiner*—Scott Baderman
(74) *Attorney, Agent, or Firm*—Beyer, Weaver & Thomas LLP.

(57) ABSTRACT

Online support is given for operation of a device. First, a client system equipped with the device is connected to a user support server that gives online support for operation of the device. Next, the client system transmits device information for which the device model can be specified and use environment information indicative of an operation environment of the device to the user support server system. Finally, using the information transmitted to the user support server system, the device support information for supporting operation of the device that the client system has is generated, and the device support information is transmitted to the client system.

34 Claims, 27 Drawing Sheets

Fig. 5

| Type of Information | Information Example |
|---|---|
| Printing environment information | Printer driver information, firmware information, ink cartridge ID, remaining ink volume, ink package opening date, memory volume, CPU, setting data, operating system |
| Print log information | Print count, print time, printing environment at time of printing |
| Operating log information | Operation description, generated error code, error generation time |
| Process data | Printing data, computer internal process data |

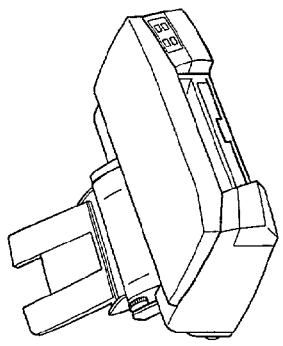
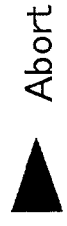
Fig. 14

Fig. 19

Printer One Click Support

Here is the explanation of the estimation process.

1. As a result of an internal diagnosis of the computer and printer, no malfunction was found in the printer driver.
2. It is reported that the printer driver interferes with the software (OO).

Therefore, we estimate that the problem will be solved by deleting software (OO).

If the diagnosis results are correct, then the following symptoms should be occurring. Please confirm.

1. A banding type noise is shown in a printed paper, or
2. Specific characters are not printed during printing.

▲ Return to the previous page.

Fig. 23

Printer One Click Support

Printing jobs could not be completed.

This malfunction occurs when printing using application (OO). This can be avoided by changing the printer driver settings. This malfunction occurs with the printer driver setting being set to "Reduce."
The probability of this estimation is 90%.

Is it OK to change the printer driver settings?

▲ Yes  ▲ No (find another resolution method)

▲ See estimate process

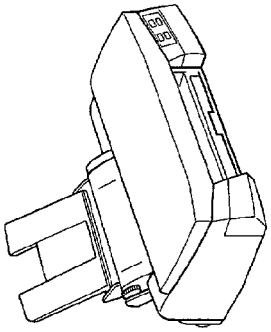

Fig. 24

Printer One Click Support

Here is the explanation of the estimation process.

1. It is reported that a malfunction will occur when using application (○○) in a Macintosh(TM) environment with the printer driver settings set to "Reduce."
2. No failure was found in the internal diagnosis of the computer and printer.

If the diagnosis results are correct, the following symptoms should be occurring.

1. Application (○○) freezes after printing execution.
2. An error message (○○) is displayed.

▲ Return to the previous page.

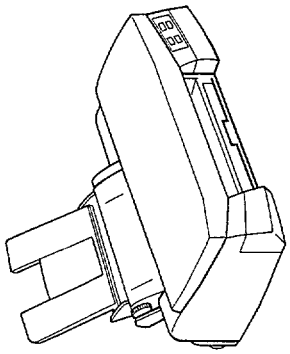

USER SUPPORT

BACKGROUND OF THE INVENTION

1. Field of the Invention

The present invention relates to the technology for giving online support for operation of a device.

2. Description of the Related Art

A method of performing user support online via the internet for various devices such as printers and scanners is becoming increasingly popular. One example of such a support system is a support method using e-mail. With this support system, when an malfunction occurs with a device, the user sends a description of the malfunction by e-mail to the support department provided by the device manufacturer. The support department analyzes the cause of the malfunction from information in the e-mail, and provides to the user a measure for solving the problem.

For online support, there is also a support method of providing support information for solving problems relating to device use or device malfunction, so-called online help, using an internet web page. Generally, with web pages provided by a device manufacturer, resolution methods are provided for typical problems and malfunction.

However, for the general user, it is difficult to sufficiently explain the device operating status and states of the malfunction, so it was difficult to provide smooth support by e-mail and telephone. Also, since it is difficult to understand a device's operating status and malfunction for general users, it was still difficult to resolve problems by using so-called online help.

With the prior e-mail and telephone support methods, it was necessary to deal with the cause of problems individually, and a redundant burden arose for support. As a result, this hindered support for serious malfunction for which resolution was difficult.

SUMMARY OF THE INVENTION

Accordingly, an object of the present invention is to lighten the burden both on the user and support sides when giving online support for device operation.

In order to attain the above and the other objects of the present invention, there is provided a user support method of providing online support for operation of a device. The support method comprises the steps of: connecting a client system to a user support server system configured to provide online support for operation of the device; transmitting device information indicative of a device model and environment information indicative of an operation environment of the device, from the client system to the user support server system; generating device support information for supporting operation of the device in the user support server system, with the information transmitted to the user support server system; and transmitting the device support information from the user support server system to the client system.

In the user support method of the present invention, device information indicative of a device model and environment information indicative of an operation environment of the device are transmitted to the user support server. Therefore the user of the device is released from the burden of explaining this information to the user support side. Meanwhile, the user support side can easily obtain the necessary information for giving user support, making smooth user support possible.

In a preferred embodiment of the invention, the user support server system preferably resolves malfunction of the device automatically, by using the device malfunction resolution information. This arrangement resolve the malfunction of the device automatically, so the burden on the user is lightened even further.

In a preferred embodiment of the invention, the method gives offline support for operation of a device on a computer connected to the device, comprising the steps of: generating device support information for supporting operation of the device with environment information indicative of an operation environment of the device; displaying the device support information on the computer. In this arrangement, it is possible to solve problems without connecting to the internet.

In another embodiment of the invention, information is provided online from a user support server system configured to provide online support for operation of the device in response to requests from clients equipped with the device. This method comprises the steps of connecting a client system to the user support server; transmitting device information indicative of a device model from the client system to the user support server; and transmitting information available for operation of the device from the user support server system to the client system, in accordance with the information transmitted to the user support server system.

With this embodiment, device information indicative of a device model is transmitted to the user support server system, so it is possible to provide information for this device user only. As a result, it is possible to limit distribution of software that is under development and for which quality is not guaranteed to specific entities.

The present invention can be realized in a variety of embodiments, and can be realized, for example, in embodiments such as an information provision control method and information provision control device, a computer program that realizes these methods or device functions, the recording medium on which is recorded this computer program, and data signals implemented within the carrying wave that includes that computer program, etc.

These and other objects, features, aspects, and advantages of the present invention will become more apparent from the following detailed description of the preferred embodiments with the accompanying drawings.

BRIEF DESCRIPTION OF THE DRAWINGS

FIG. 5 is a table showing an example of information transmitted to the user support server system from the client system for user support.

FIG. 9 is an explanatory diagram that shows an example of a transmission form for inputting an explanation of the situation the user is in.

FIG. 14 is an explanatory diagram that shows an example of a dialog box that shows that the client system is being diagnosed.

FIG. 19 is an explanatory diagram that shows an example of a dialog box that shows the estimate process by the client side agent.

FIG. 23 is an explanatory diagram that shows an example of a dialog box that shows the diagnosis results.

FIG. 24 is an explanatory diagram that shows an example of a dialog box that shows the estimate process for the diagnosis results.

DESCRIPTION OF THE PREFERRED EMBODIMENT

Figure 1:
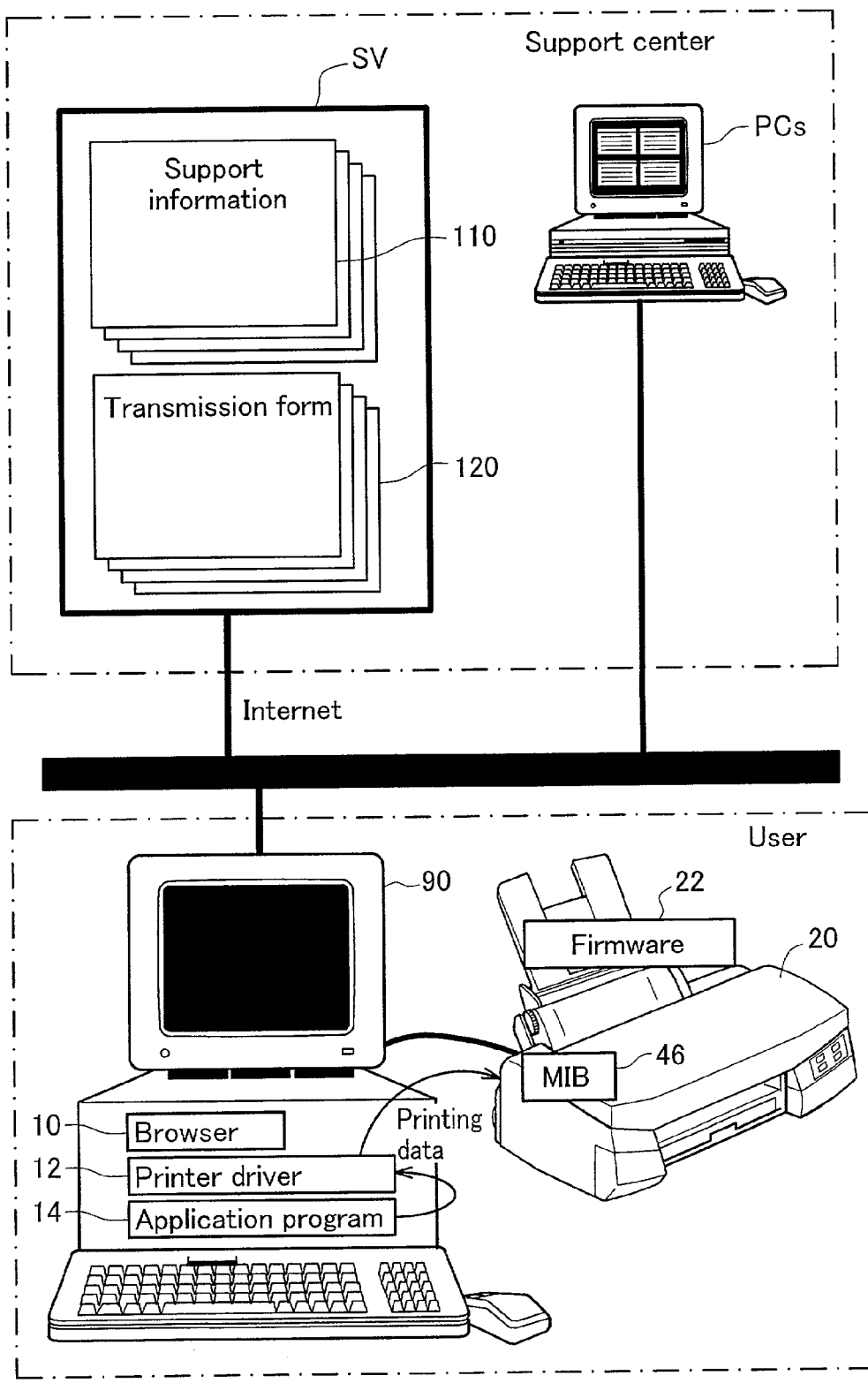
FIG. 1 is an explanatory diagram that shows a system configuration example of online user support.

The present invention is explained in the following sequence based on embodiments.
A. System Configuration and User Registration Processing
B. User Support Centered on Support Personnel
C. User Support Centered on Artificial Intelligence
D. Support Example
E. Prior Provision of New Technology
F. Variations A. System Configuration FIG. 1 is an explanatory diagram that shows a system configuration example of online user support. The upper half of the figure shows the structure of the support center that performs user support, and the lower half shows the structure of the client system that the user uses. The support center consists of a user support server system SV and support personnel. User support for device users can be provided by any entity, but with this embodiment, to make the explanation easier, we will use an example of a printer manufacturer providing support. Following, we will use printer 20 as a device example for explanation.

The client system is formed with printer 20 connected by a parallel cable to computer 90. With this embodiment, we show a case when printer 20 is connected locally to computer 90 using a parallel cable, but it is also possible to construct this system by connecting via a LAN (Local Area Network). However, in either case, it is preferable that bidirectional communication between computer 90 and printer 20 be possible.

A number of programs that are activated on a specified operating system 11 are installed in computer 90. Here, as representative programs, we are showing browser 20 used for browsing web pages, printer driver 12 for exhibiting functions that drive printer 20, and application program 14 that generates text and image data to be printed by printer 20. When printing, together with a print command, a file to be printed is received by printer driver 12. Printer driver 12 performs rendering and other processing on this file, and generates print data to supply to printer 20. Printer 20 obtains this print data via the parallel cable and executes printing. Printer 20 also includes firmware 22 that controls this operation and MIB (Management Information Base) 46 that is a database for maintaining at least the operation status of the printer. Computer 90 can obtain information relating to the operating environment of printer 20, etc. by accessing this MIB 46.

Figure 2:
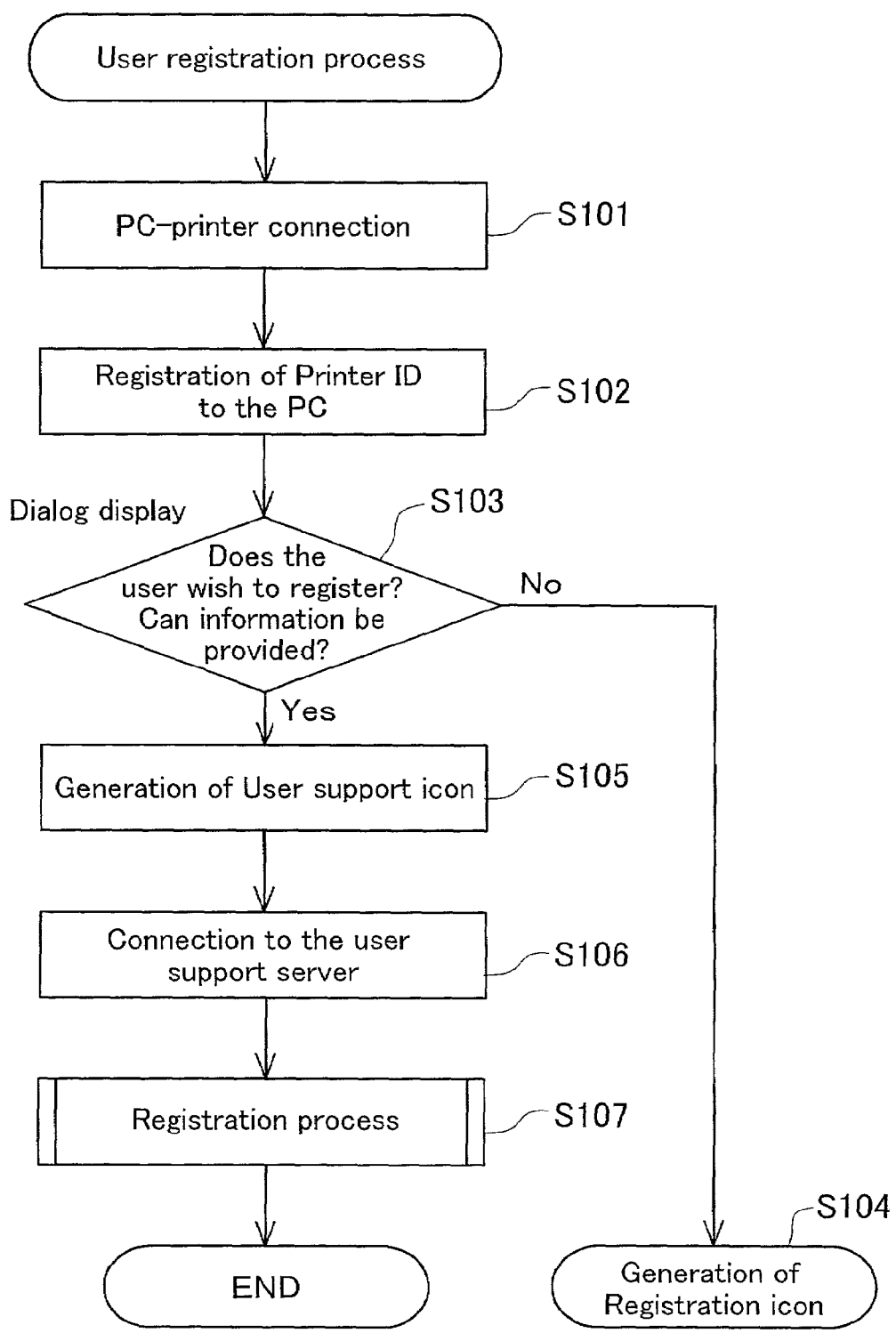
FIG. 2 is a flow chart that shows the procedure for the user registration process for online support.

FIG. 2 is a flow chart that shows the procedure for the user registration process for the online support. At step S101, computer 90 and printer 20 are connected. This connection becomes a trigger to start the user registration process for online support. However, at the time this connection is made, we can assume that printer driver 12 is not installed in computer 90. At this time, the installation of printer driver 12 becomes a trigger to start the user registration process for online support. At step S102, the printer ID is registered in computer 90. When this registration is completed, the process advances to step S103, and a dialog box (not illustrated) inquiring whether or not the user wants to register is displayed to the user.

When the user replies that user does not wish to register, the process advances to step S104, and an icon for user registration is generated on the desktop, for example, and user registration process ends. The user registration icon is created so that the user can do user registration at any time. On the other hand, when the user replies that user does wish to register, the dialog box shown in FIG. 3 is displayed.

Figure 3:
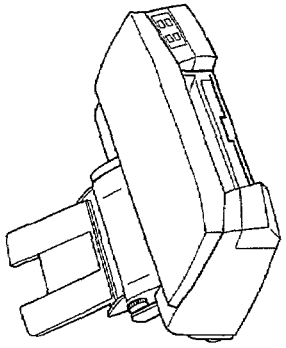
FIG. 3 is an explanatory diagram that shows an example of a dialog box that inquires the user whether to allow or reject provision of information.

FIG. 3 is an explanatory diagram that shows an example of a dialog box that inquires whether to allow or deny provision of information to the user. This dialog box confirms with the user whether or not to permit provision of information for user support. The reason why it is confirmed whether to allow or deny provision of information is that with the user support of this embodiment, provision of client system internal information is necessary, and it is possible that private information may be included. When a user rejects provision of information, this is recorded as user registration information, and the situation will be handled using the prior support method.

At step S105, a user support icon is generated. By clicking this user support icon, a registered user can receive the online user support of the first embodiment of the present invention. Also, when the user registration process is suspended due to a communication error or other circumstance, the user registration process can be restarted by clicking this user support icon.

At step S106, computer 90 is connected to user support server system SV. This connection is made automatically using the printer ID registered in computer 90. When the connection is completed, the process advances to step S107 and the user registration process to user support server system SV is started.

Figure 4:
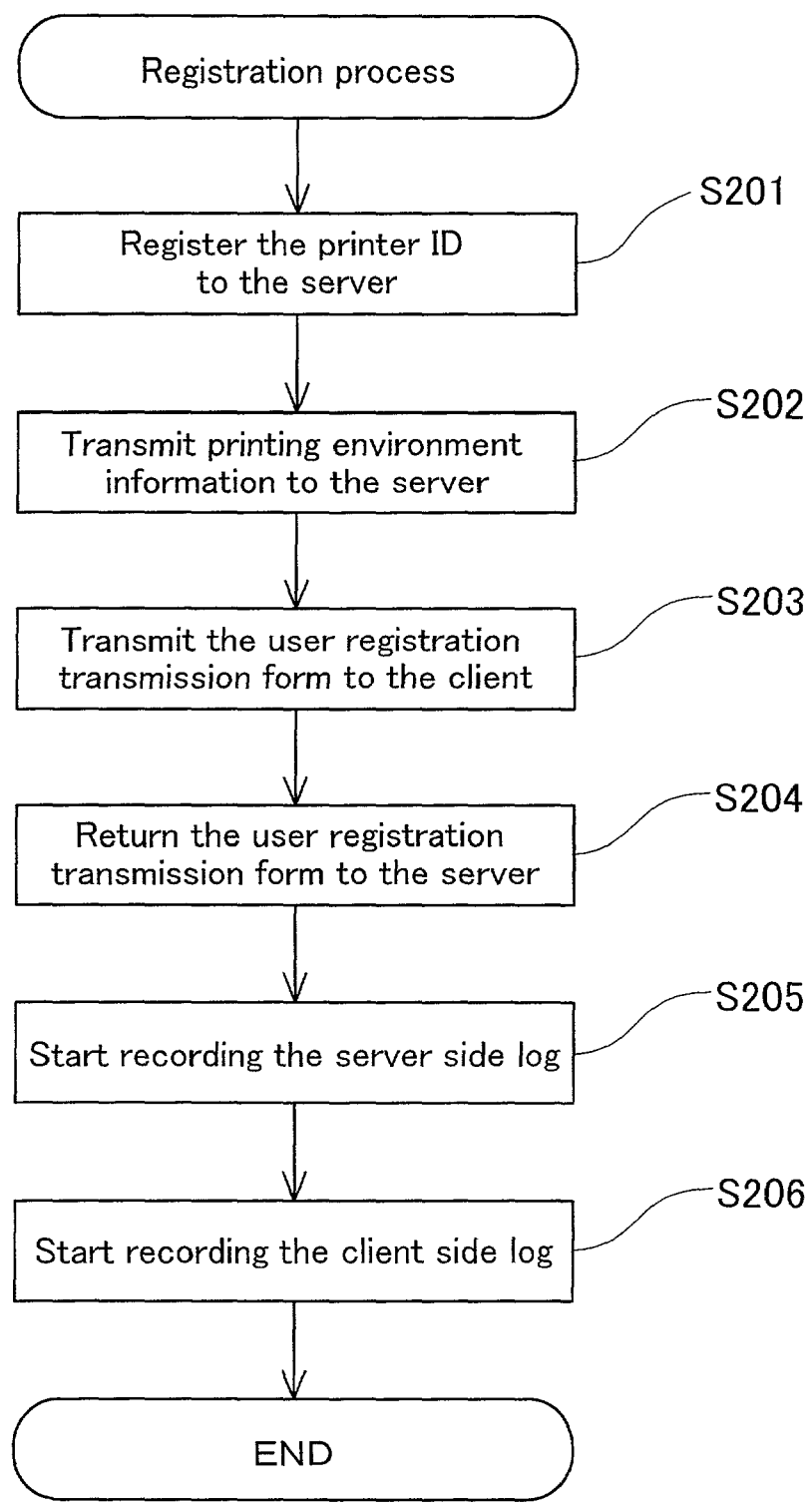
FIG. 4 is a flow chart that shows the procedure for the registration process to the user support server system.

FIG. 4 is a flow chart that shows the procedure for the registration process to the user support server system SV. At step S201, the user's printer ID is registered to the user support server system SV. By registering the printer ID, it is possible to create a customer database with this as a reference, making customer management easier. At step S202, computer 90 transmits client side printing environment information to the user support server system SV. This printing environment information is, of the client system format information, information that may be related to execution of printing work. By having the user side understand this information, user support becomes easy.

FIG. 5 is a table that shows an example of information transmitted from the client side for user support to the user support server system SV. As shown in the figure, the information transmitted to the server can include not only printing environment information, but also print log information that can be used as device malfunction diagnosis information, operation log information, and process data. We will give a detailed explanation of these types of data later. For the printing environment information, each time there is a change in the printing environment, it is desirable to register that change. There are also many cases when support is necessary due to printing environment changes, so the change in printing environment is beneficial information for implementing support. Obtaining the printing environment information can be done by reading part or all of the register data when operating system 11 of computer 90 is Windows. It is also acceptable to record printing environment information to MIB 46 equipped in printer 20 and upload it to user support server system SV. When receiving of printing environment information by user support server system SV is completed, the process advances to step S203.

At step S203, user support server system SV transmits transmission form for user registration 120 (FIG. 1) to computer 90. This form can be customized in response to the previously received information. Transmission form 120 can be changed for each device, for example. At step S204, the user inputs specified items to transmission form for user registration 120 and transmits it to user support server system SV. By doing this, it is possible to match a printer ID with a user. In other words, a user can be specified from a printer ID, making user support even easier.

At step S205, recording of the log relating to the user support starts. By referencing this log, a user looking for support can know what kind of support was received in the past. By doing this, the user support personnel can proceed with user support more smoothly.

At step S206, recording of the client system log starts. As shown in FIG. 5, this log contains print log information and operation log information. Print log information is information that shows information relating to printing done in the past by the printer 20 to be supported, including information such as under what printing environment, when, and what volume of printing was executed. Operating log information is a record of the operating contents of a set time period before the occurrence of an error or before clicking of the support icon, for example. These types of information are used to reproduce the state of the user requesting support on the user support side. This is because suitable user support can be performed more reliably if the state subject to support can be reproduced on the support side.

Recording of this information can be done by a recording device of computer 90, MIB 46 of printer 20, or bi-directionally. However, considering the fact that these devices can fail, it is preferable to record bi-directionally.

B. User Support Centered on Support Personnel

Figure 6:
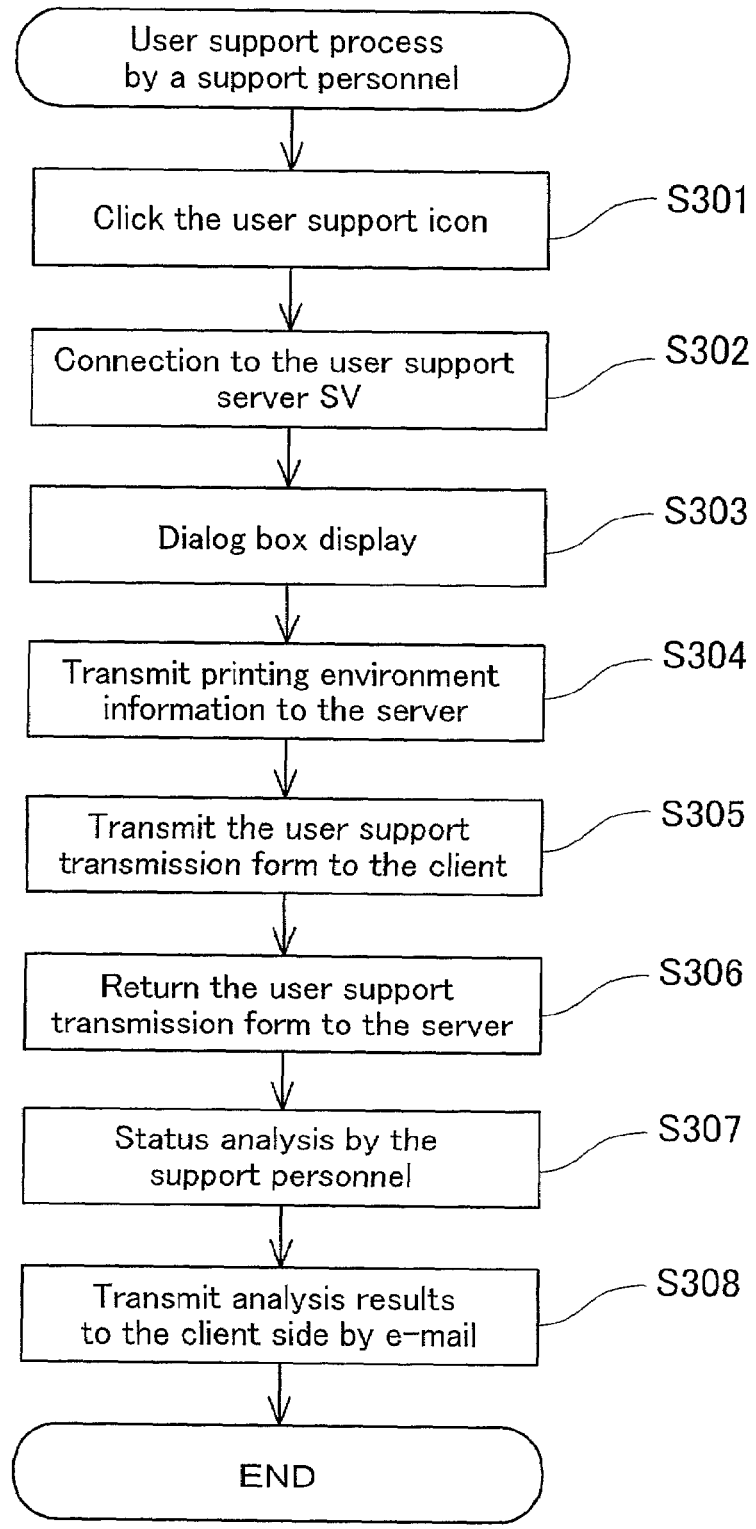
FIG. 6 is a flow chart showing the procedure for the user support process by support personnel.
Figure 7:
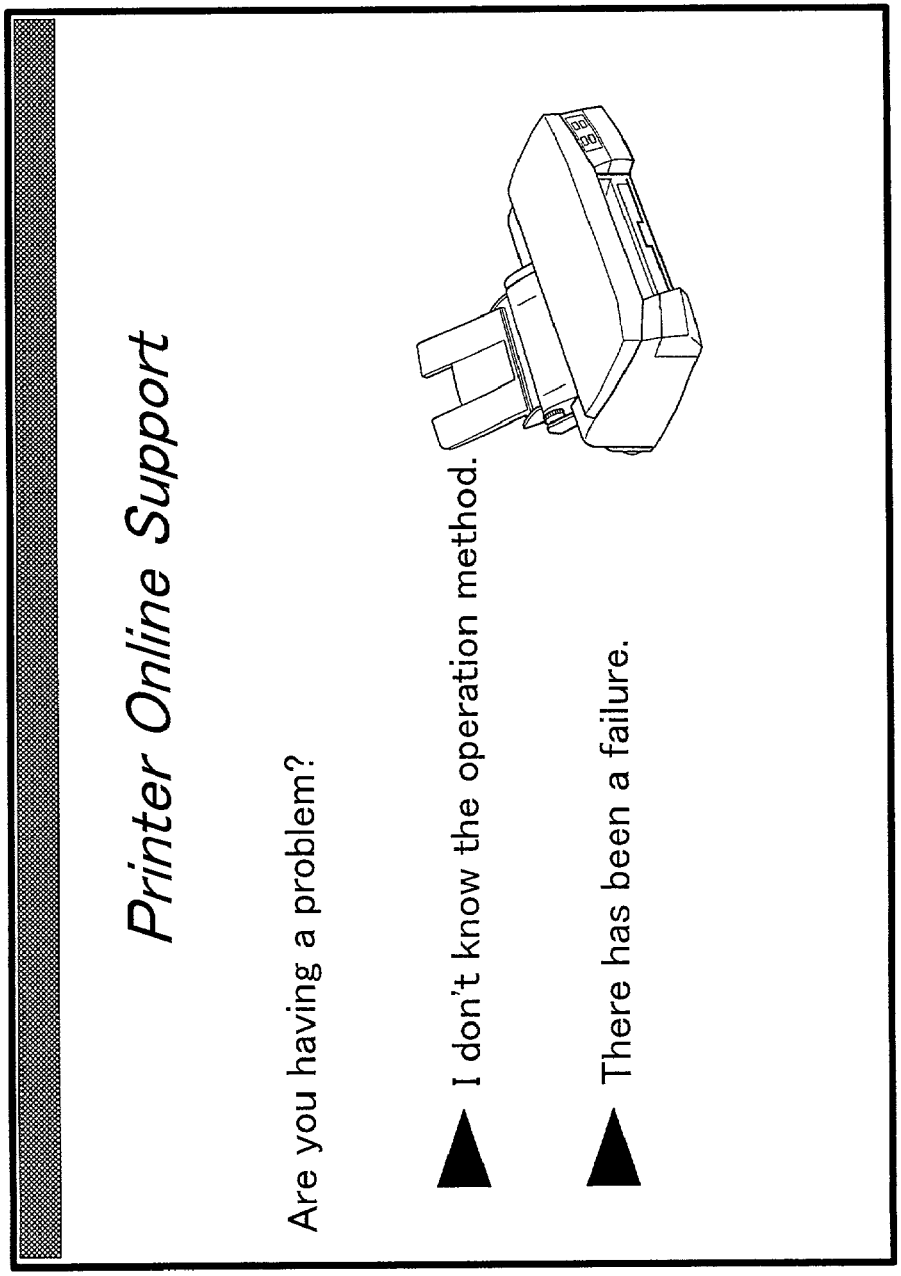
FIG. 7 is an explanatory diagram that shows an example of a dialog box that inquires the user about the contents of the support desired.

FIG. 6 is a flow chart that shows the procedure for the user support process by support personnel, and FIG. 7 is an explanatory diagram that shows an example of a dialog box that inquires of the user a description of the support that user wants. At step S301, the user clicks the user support icon. By doing this, the user support process starts, and the process advances to step S302. At step S302, computer 90 is connected to user support server system SV via the internet. When this connection is completed, the process advances to step S303, and the dialog box shown in FIG. 7 is displayed. With this dialog box, the user can select the support contents, selecting, for example, from "Operating contents inquiry" and "Failure." When this selection is made, the process advances to step S304, and computer 90 transmits both the results of that selection and the printer ID to user support server system SV.

The support center that obtained the printer ID uses the printer ID to specify the printer 20 to be supported. Furthermore, the user support registration user can be specified by referencing the database within the support center. Also, by checking the printing environment information received at the same time, the user support personnel can know the printing environment of the client system requesting support at that point. Also, the printer ID and user are specified, so by referencing the server side log information, it is possible to make comparisons with past printing environments. By doing this, support can proceed smoothly. When user specification is completed, a dialog box to be described later is displayed.

Figure 8:
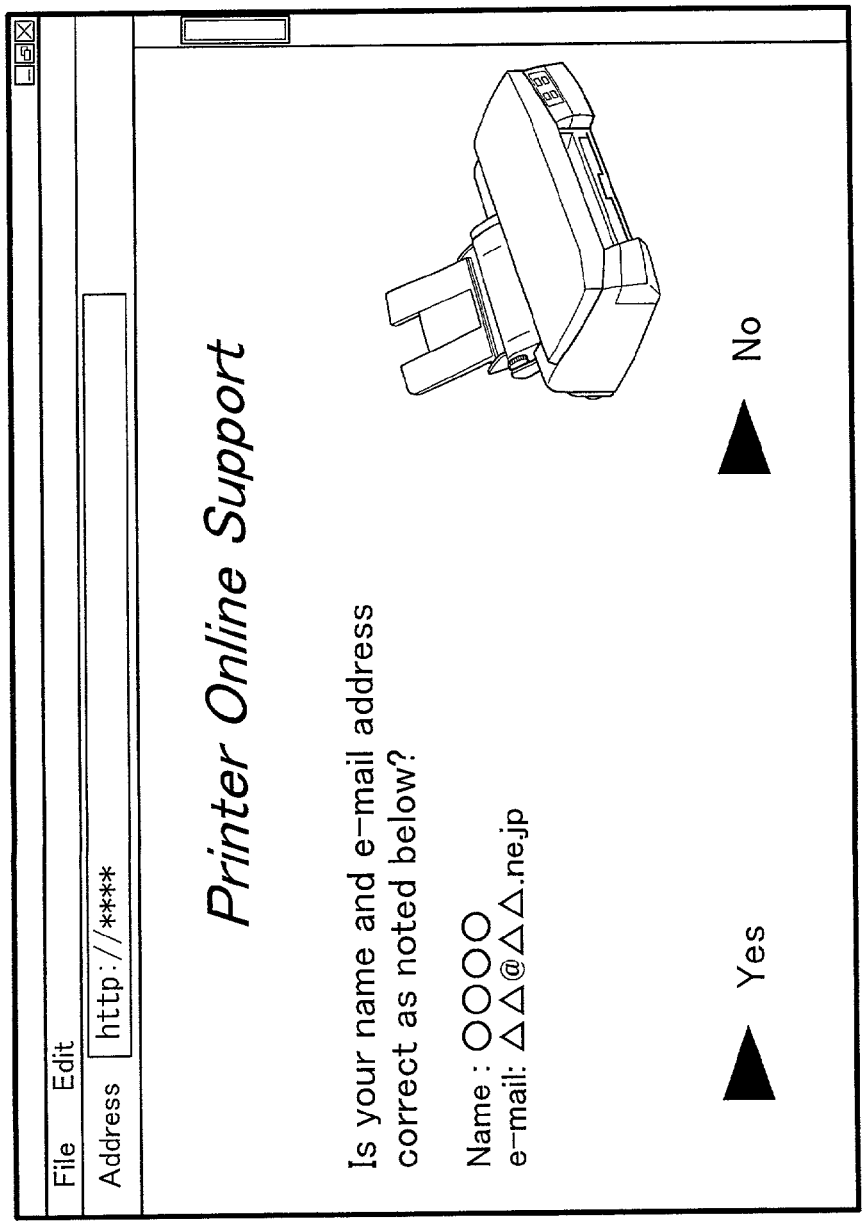
FIG. 8 is an explanatory diagram that shows an example of a dialog box that confirms the user contact information.

FIG. 8 is an explanatory diagram that shows an example of a dialog box for confirming the user contact information. This dialog box not only confirms whether there is a match with the user registered in the database in the support center, but also displays to confirm the contact information of the user to be supported. When this confirmation ends, the process advances to step S305, and user support server system SV transmits transmission form for user support 120 to computer 90. When there is a change for the user, user registration can be done again by selecting No using the dialog box shown in FIG. 8.

Figure 9:
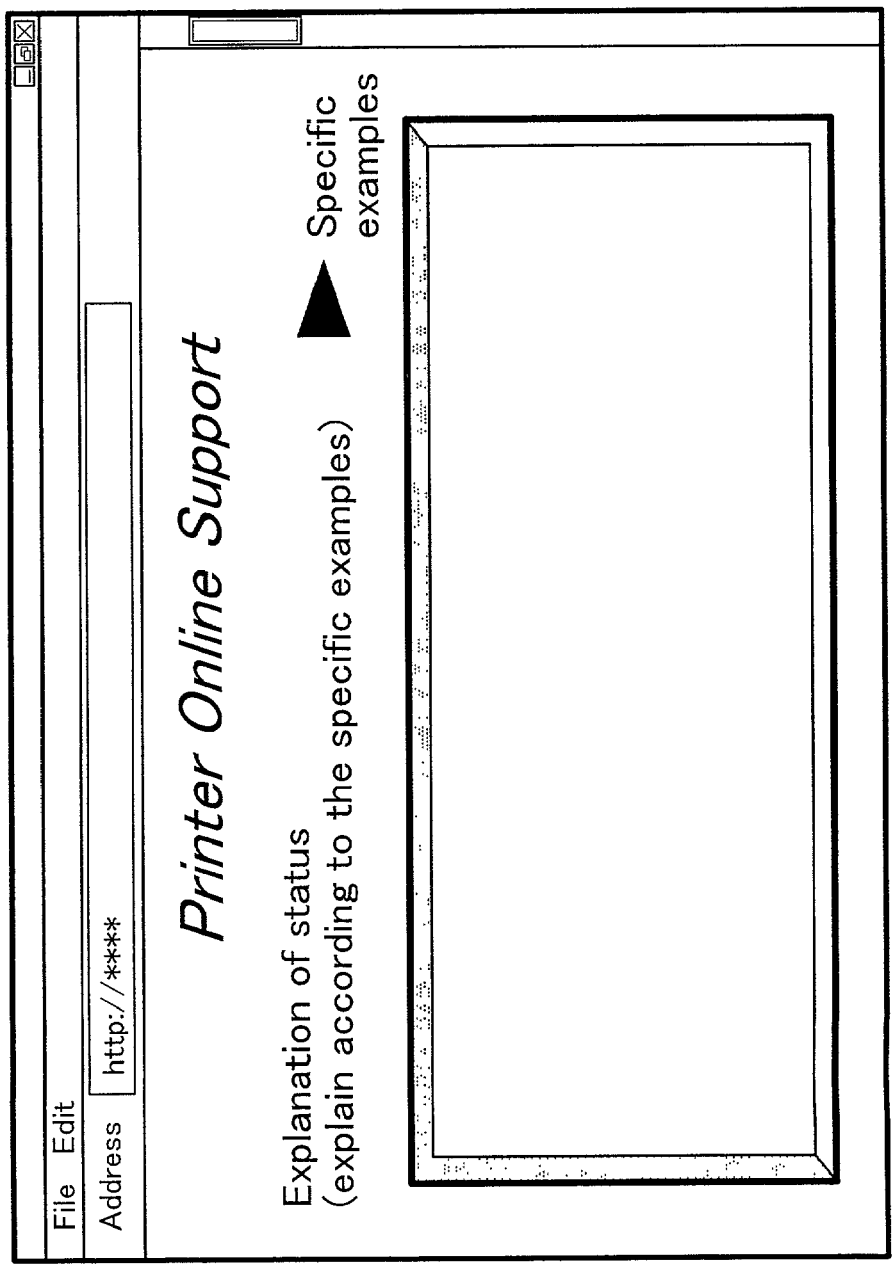

FIG. 9 is an explanatory diagram that shows an example of a transmission form that inputs an explanation of the situation the user is in. At step S306, the user inputs specified items in transmission form for user support 120 (FIGS. 1 and 9) received by the client system, To make input easy for the user, it is preferable to attach an input sample in the transmission form for user support 120 and to focus the noted contents using a selective display. When this is returned, print environment information, print log information, and operation log information are also transmitted at the same time. When it is confirmed that the client system has finished the support center receive, information fetching is completed, and the connection between the client system and the user support server system SV is released. When this connection is released, it is preferable to make a display (not illustrated) that shows that there will be contact later.

At step S307, analysis of the status of the client system by the support personnel starts. This status analysis can be done using the following procedure when the support is for an malfunction, for example.

(1) An estimate is made of the user capabilities. This can be estimated from the past support log information recorded at the server. By knowing the capabilities, it is possible to estimate to some degree whether the malfunction is simple or severe.

(2) The printing environment is specified. First, a check is made of whether the malfunction is based on software interference or some other printing environment issue. This check is done by referencing the support information put into database form in the support center. Also, by comparing with past printing environments, the differences with the current printing environment are specified, and it is possible to use this as malfunction diagnosis reference material. Also, if print log information can be obtained, it is possible to know the status of past printing that was done correctly and the burden on printer 20, making it easier to specify the cause of the malfunction.

(3) The operation contents are specified. If operation log information can be obtained, it is possible to specify the operation contents up until an error or other status for which support is being requested occurred. If specification is possible up to the operation contents, it is also possible to reproduce the client system environment at the support center, making support even easier.

When analysis by the support personnel ends, the process advances to step S308, and the analysis results are sent as e-mail to the contact address confirmed at step S304. Contact can be made not only by e-mail, but by fax or telephone. It is preferable that the contents of the e-mail, etc. be put into a fixed form and put into a database. By doing this, it is possible to reduce redundant labor, and to improve support efficiency.

As described above, printing environment information and other information necessary for user support are provided to the user support personnel online in an objective manner, making user support easy. There is a great lightening of the burden of explaining the client system status for the user as well, making it possible to have smooth operation of user support.

C. User Support Centered on Artificial Intelligence

Figure 10:
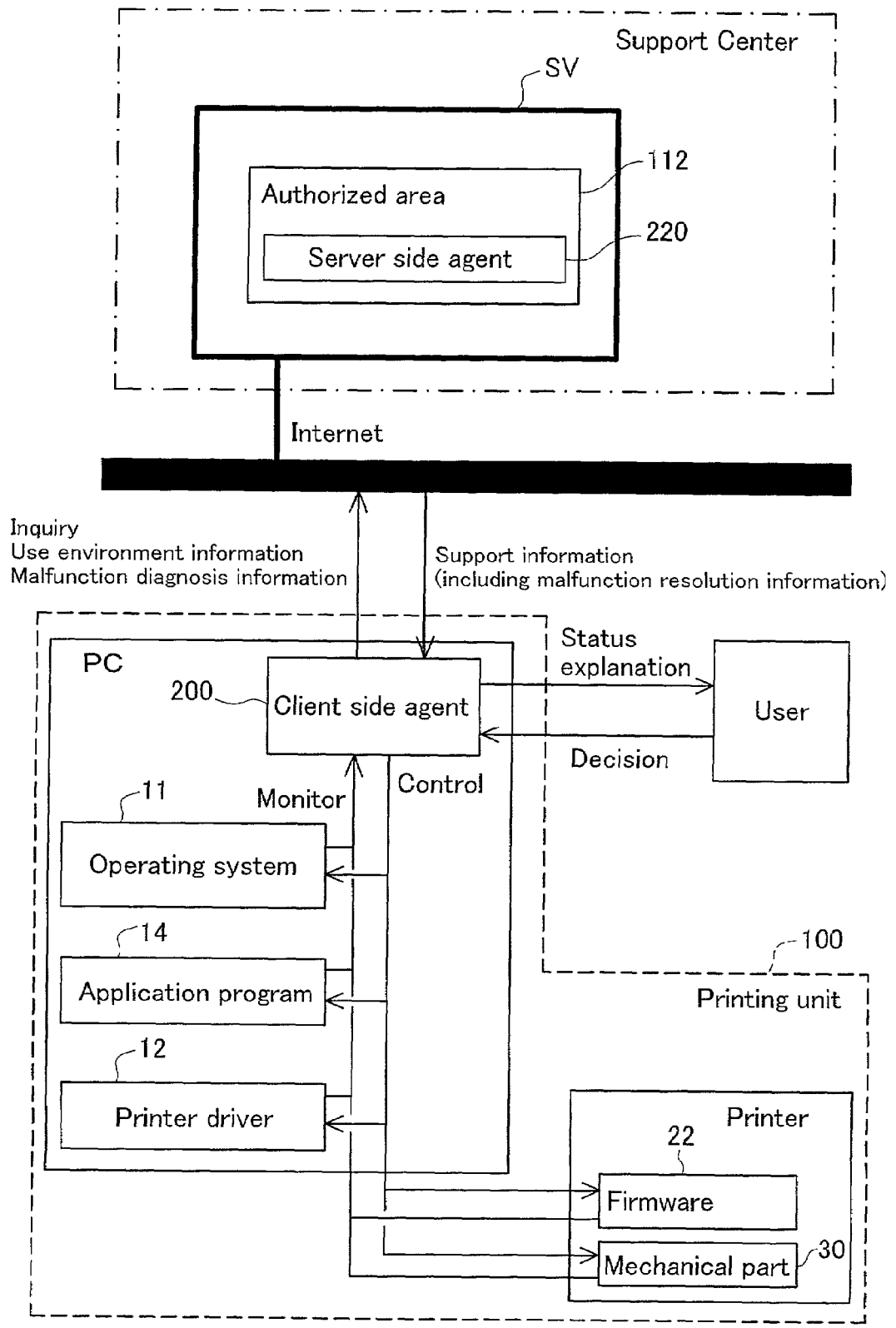
FIG. 10 This is a block diagram that shows the structure of a user support system using distributed artificial intelligence.

FIG. 10 is a block diagram that shows the structure of a user support system using distributed artificial intelligence. This is an expert system consisting of multiple artificial intelligence elements (experts). This expert system defines each expert as an agent, and with this system, each agent performs support independently or with consultation when necessary.

This expert system for malfunction diagnosis consists of client side agent 200 defined as a client side expert and server side agent 220 defined as a server side expert. Client side agent 200 functions as an agent having a user side malfunction diagnostic function, and server side agent 220 functions as an agent having a server side malfunction diagnostic function.

Figure 11:
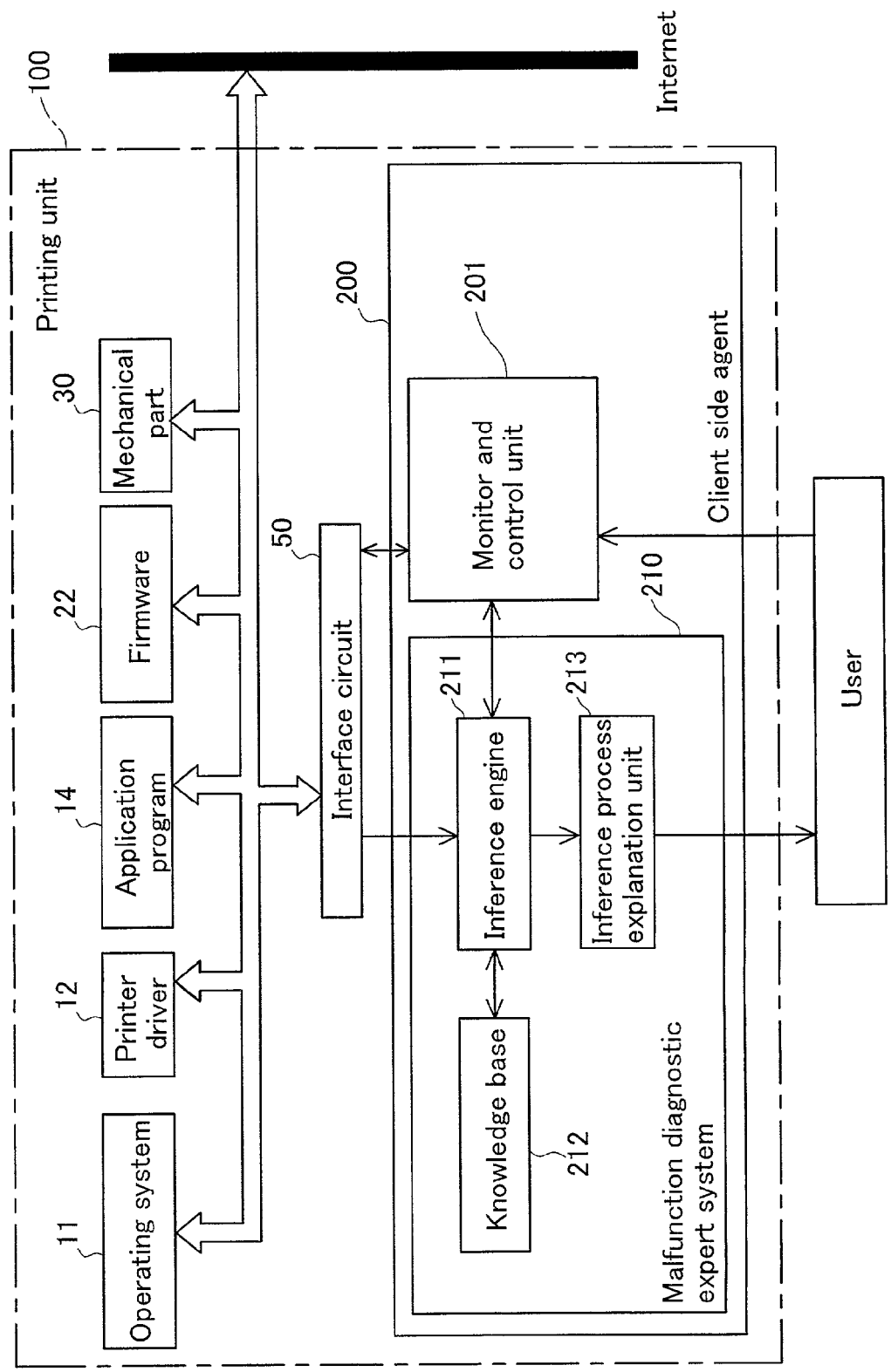
FIG. 11 is a block diagram that shows the structure of a printing unit for which the client side agent is the central focus.

FIG. 11 is a block diagram that shows the structure of printing unit 100 with client side agent 200 as the central focus. This printing unit 100 consists of client side agent 200, interface dedicated circuit 50, operating system 11, printer driver 12, application program 14, firmware 22, and mechanical part 30. This client side agent 200 consists of client side monitoring and control unit 201 and client side malfunction diagnostic expert system 210.

Client side malfunction diagnostic expert system 210 consists of client side inference engine 211 for performing inference for malfunction diagnosis, client side knowledge base 212 formed from knowledge that is the foundation for this inference, and client side inference process explanation unit 213 that generates information for explaining the inference process to the user. Development of client side malfunction diagnostic expert system 210 can be done easily by using general purpose expert system building tools consisting of an empty knowledge base and inference engine. Specifically, by accumulating knowledge for malfunction diagnosis of printing unit 100 in the knowledge base, it is possible to build an malfunction diagnostic expert system for printing unit 100. For general purpose expert system building tools, there are many tools including EMYCIN™ and ESHELL™ that have been developed and are available for use. Also, C language based tools that operate in Macintosh™, Windows™, and UNIX™ environments are becoming increasingly widespread.

The malfunction diagnostic expert system 210 that client side agent 200 is equipped with can be provided to the user together with printer 20 as an expert system that is equipped with a knowledge base in which data is input, or can be provided to the user as a general purpose expert system building tool. In the latter case, the data input to the knowledge base is downloaded from the user support server system SV. In either case, it is preferable that the data within the knowledge base can be updated.

Client side agent monitoring and control unit 201 is the core unit of client side agent 200 that collects information for malfunction detection and malfunction diagnosis. This client side monitoring and control unit 201 controls client side malfunction diagnostic expert system 210 while also controlling operating system 1, application program 14, and modules subject to malfunction diagnosis (printer driver 12, firmware 22, and mechanical part 30) via interface dedicated circuit 50. By doing this, gathering of information for malfunction diagnosis of printing unit 100 and malfunction repair are performed. Note that operating system 11 and application program 14 can be added as subjects of malfunction diagnosis.

Figure 12:
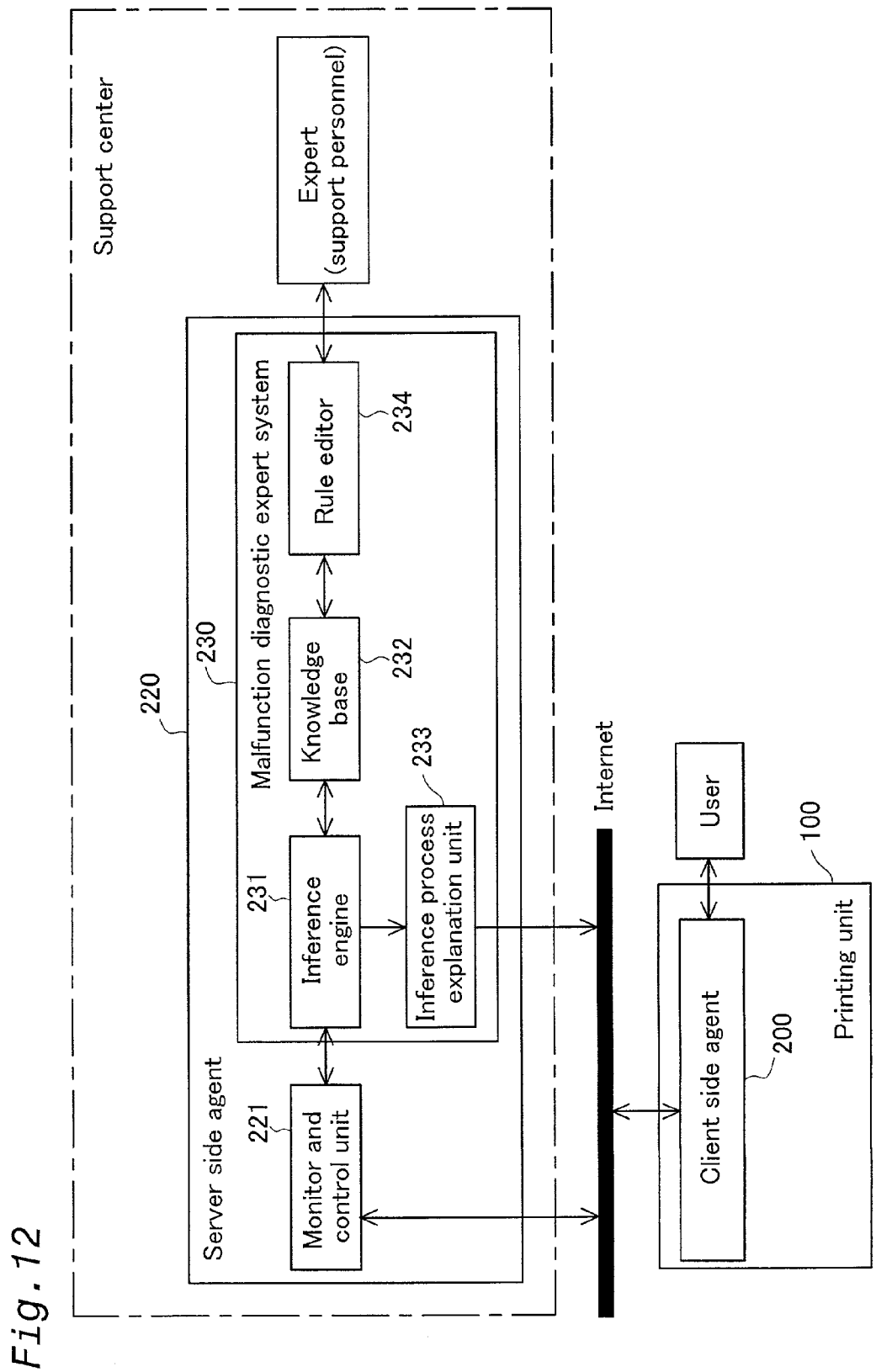
FIG. 12 is a block diagram that shows the structure of a support system for which the server side agent 220 is the central focus.

FIG. 12 is a block diagram that shows the structure of a support system for which server side agent 220 is the central focus. This server side agent 220 consists of monitoring and control unit 221 and malfunction diagnostic expert system 230. According to the status, this server side monitoring and control unit 221 can negotiate with the client side agent 200 via the internet, or can directly monitor and control printing unit 100. As is the case with client side malfunction diagnostic expert system 210, this server side malfunction diagnostic expert system 230 is equipped with inference engine 231 and knowledge base 232, and is further equipped with rule editor 234 for the support personnel who is an expert to edit knowledge base 232.

Figure 13:
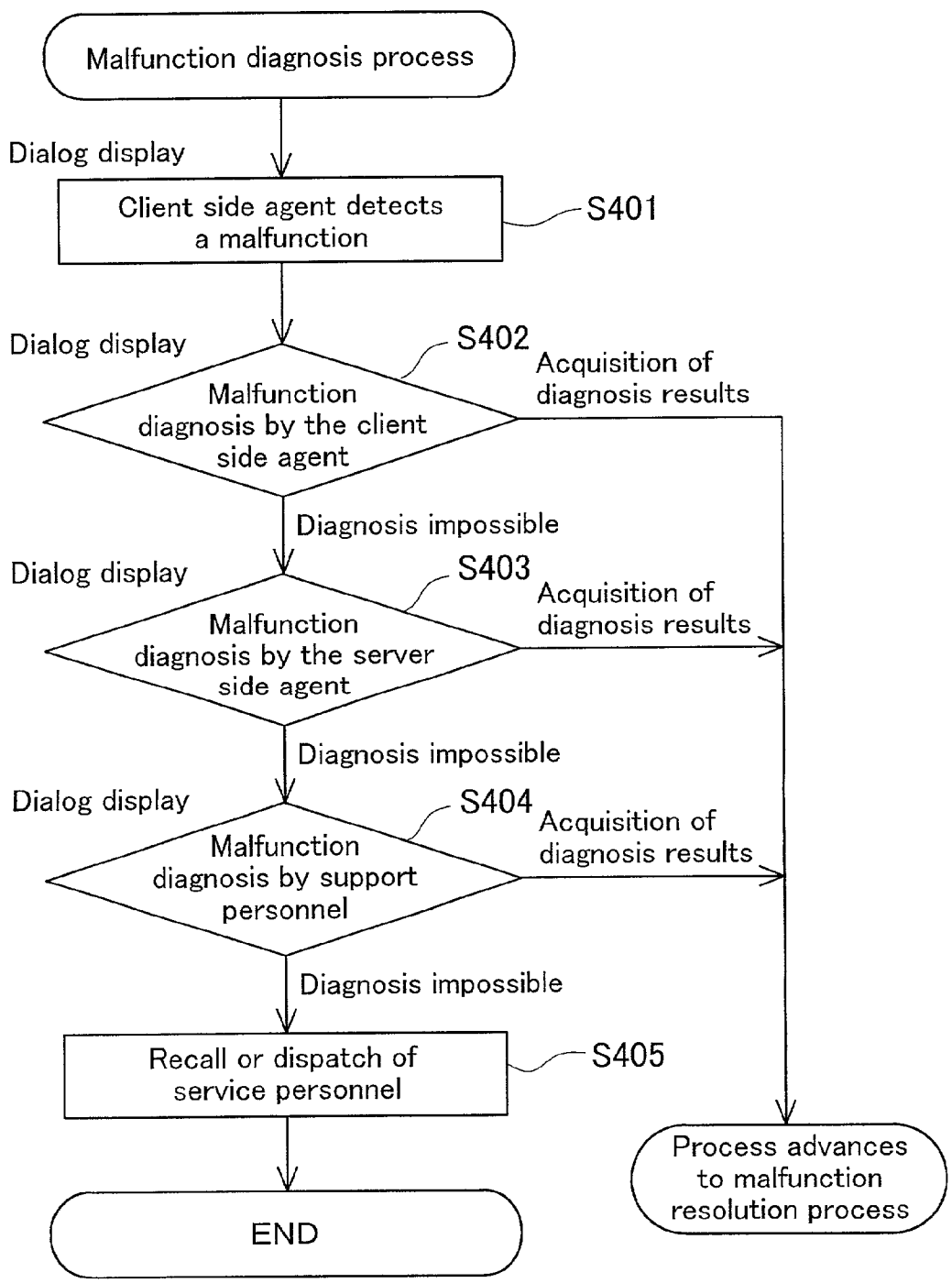
FIG. 13 is a flow chart that shows a procedure for the malfunction diagnosis process of an embodiment of the present invention.

FIG. 13 is a flow chart that shows the procedure for the malfunction diagnosis process for an embodiment of the present invention. At step S401, monitoring and control unit 201 of client side agent 200 detects malfunction in printing unit 100. This malfunction detection triggers the malfunction diagnosis process. Even if an malfunction is not detected, if the user support icon is clicked, the malfunction diagnosis process starts. When this malfunction diagnosis process starts, the dialog box described hereafter is displayed.

FIG. 14 is an explanatory diagram showing an example of a dialog box that shows that the client system is currently being diagnosed. This dialog box shows that malfunction diagnosis of printing unit 100 is being performed either by client side agent 200, server side agent 220, or bi-directionally. By using this dialog box, the user can know the status of printing unit 100 and also stop malfunction diagnosis at any time.

At step S402, client side agent 200 performs malfunction diagnosis of printing unit 100. This malfunction diagnosis diagnoses the interior of printing unit 100. With this diagnosis, if diagnosis results can be obtained, the process advances to malfunction resolution processing, and if it is deemed that diagnosis is not possible, a dialog box (not illustrated) is displayed. This dialog box asks the user for permission to connect to the user support server system SV via the internet. This connection to the user support server system SV is done to shift from malfunction diagnosis of the interior of printing unit 100 done by client side agent 200 to either remote malfunction diagnosis done by server side agent 220 or to malfunction diagnosis through coordination between client side agent 200 and server side agent 220. When this connection is complete, the process advances to step S403.

At step S403, an malfunction diagnosis in which server side agent 220 is involved is performed. This malfunction diagnosis includes the various aspects described above, and examples include having server side agent 220 diagnosis printing unit 100 directly instead of client side agent 200, and performing malfunction diagnosis through cooperation between server side agent 220 and client side agent 200. Furthermore, this malfunction diagnosis through cooperation includes aspects of having server side agent 220 and client side agent 200 communicate with each other and providing shared memory called a blackboard on the server side, for example. Generally, malfunction diagnosis through cooperation has the advantage of being able to handle more serious situations than malfunction diagnosis by server side agent 220 alone, but there is the disadvantage that the internet communication volume becomes high. Therefore, it is preferable to select one or the other according to the malfunction status. For example, at the initial stage, you could have diagnosis performed by server side agent 220 alone, and shift to cooperative diagnosis in cases when there are no diagnosis results or when the estimated probability to be described later is low.

As a result of the above diagnosis, when diagnosis results are obtained, the process advances to the malfunction resolution process, and when it is deemed that diagnosis is not possible, a dialog box (not illustrated) is displayed. This dialog box uses artificial intelligence (expert system) to notify the user that malfunction diagnosis was not possible and also asks the user for permission to shift to malfunction diagnosis by the support personnel. When permission is not given to shift to malfunction diagnosis by support personnel, the malfunction diagnosis process ends, and a message to this effect is displayed. Meanwhile, when permission is given, the dialog box shown in FIG. 9 is displayed, and when the user inputs this and transmits to the support center, the process advances to step S404.

At step S404, malfunction diagnosis is performed by support personnel. When doing this malfunction diagnosis, the support personnel considers the information gathered by client side agent 200 and server side agent 220 and the results of diagnosis thereof, and can analyze the status noted by the user in the form shown in FIG. 9. By doing this, the burden for malfunction diagnosis by support personnel is also lightened. Meanwhile, the user can also simplify his explanation of the status of printing unit 100, thus lightening the burden on the user. When diagnosis is not possible even with malfunction diagnosis by the support personnel, a dialog box (not illustrated) is displayed. This dialog box inquires whether the user wants printer 20 to be recalled or if he wants a service person to be dispatched. When the user does not want printer 20 to be recalled, etc. the malfunction diagnosis process ends, and when the user does want this, the process advances to step S405.

At step S405, depending on the status, printer 20 is recalled or a service person is dispatched. In this case, the printer 20 is specified by the printer ID, so the person in charge of repairing the recalled printer 20 can be provided with information relating to the malfunction diagnosis and any recorded repair history. By doing this, the repair burden is lightened. When a service person is dispatched as well, the same kind of information can be provided in advance.

Figure 15:
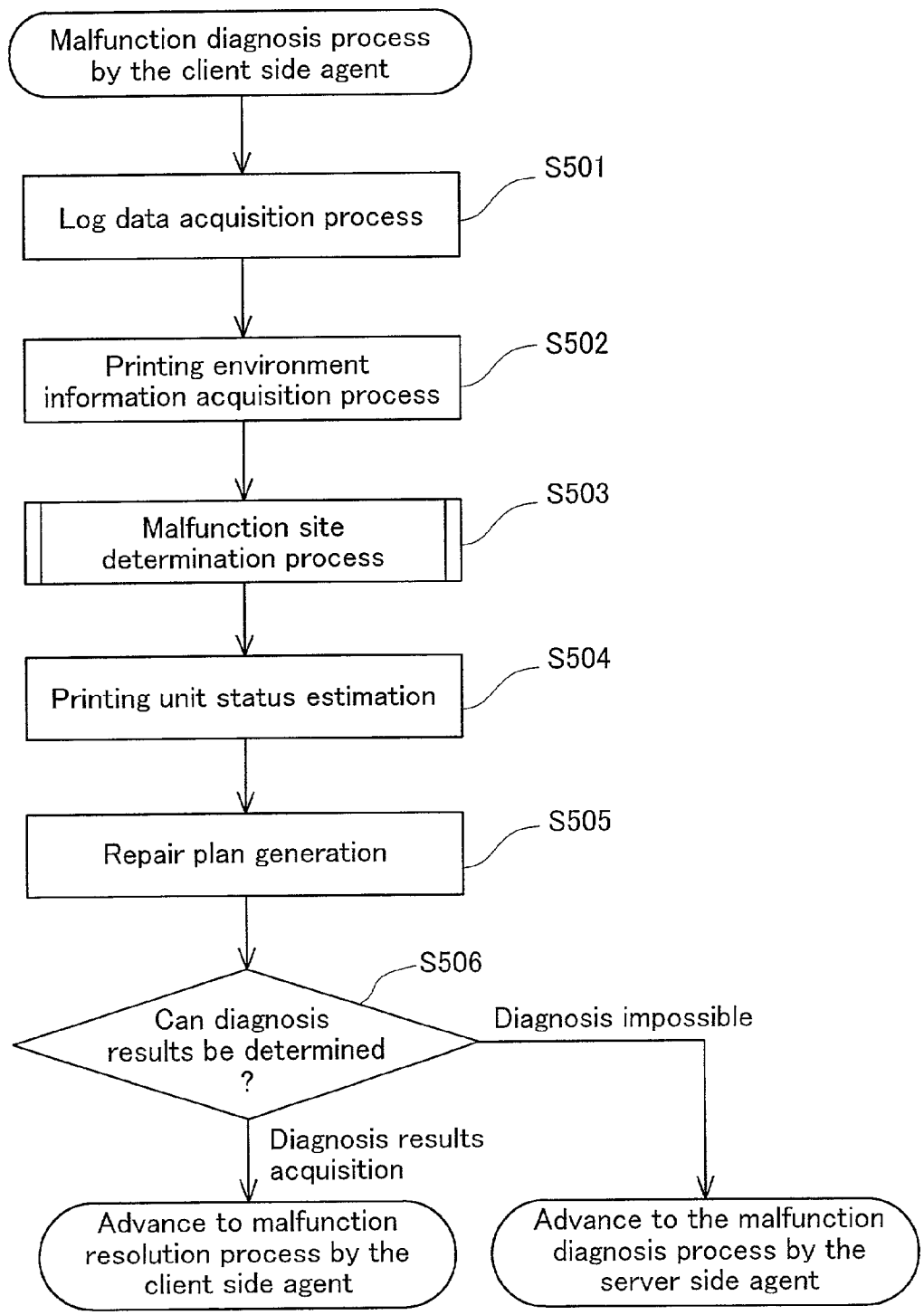
FIG. 15 is a flow chart that shows a procedure for the malfunction diagnosis process by the client side agent.

FIG. 15 is a flow chart that shows the procedure for the malfunction diagnosis process by client side agent 200. At step S501, client side agent 200 obtains the log information. As described previously, this log information includes print log information and operation log information. The log information is recorded in at least one of the recording device of computer 90 and MIB 46 of printer 20, and is read from one of these.

The print log information is information that shows information relating to printing done in the past by the printer 20 to be supported, including information such as under what printing environment, when, and what volume of printing was executed. It is possible to know the size of the burden on printer 20, for example, based on what kind of printing work was executed in the past, making it possible to specifically reference an malfunction. For example, this would be data for deciding whether the expiration of a specific part of printer 20 is approaching. Also, when printer 20 was not used for a very long time before the occurrence of an malfunction, there is the possibility of condensation of the ink due to volatility or of nozzle clogging.

It is also possible to know the capabilities for a user's printing work from whether or not a great volume of printing work was done in the past. By doing this, for example, this becomes one data for judging whether or not support is being requested as "Failure" when there is a problem with the operating method of the user. Furthermore, even when support is requested when there is a problem relating to user use such as a problem with the use method of the user, it is possible to estimate the capabilities of the user, making support easier.

The operation log information is, for example, a record of the operation contents for a fixed period before an error occurred or before the support icon was clicked. This record can be used to specify the operation contents done on computer 90 or printer 20. This information is information relating to a specified message signal or event signal within the client system. Also, this operation log information can include error codes or error messages. This makes it easier to specify malfunction.

At step S502, printing environment information is obtained. As shown in FIG. 5, the printing environment information includes, for example, operating system 11, printer driver 12, and firmware 22 information (version information and setting information), ink cartridge ID, remaining ink volume, when the ink package was opened, the volume of internal memory in computer 90, and environment information relating to execution of printing by printing unit 100 which is the CPU. It is preferable that this printing environment information include a record over time of changes to the printing environment in the past. Knowing the printing environment when printing is done correctly is especially beneficial for malfunction diagnosis.

At step S503, malfunction site specification is performed. Specification of the malfunction site is a process for specifying which place the malfunction is, whether in printer driver 12, the connection site of computer 90 and printer 20, firmware 22, or mechanical part 30. This is a process performed to increase the estimation accuracy of malfunction diagnosis.

Figure 16:
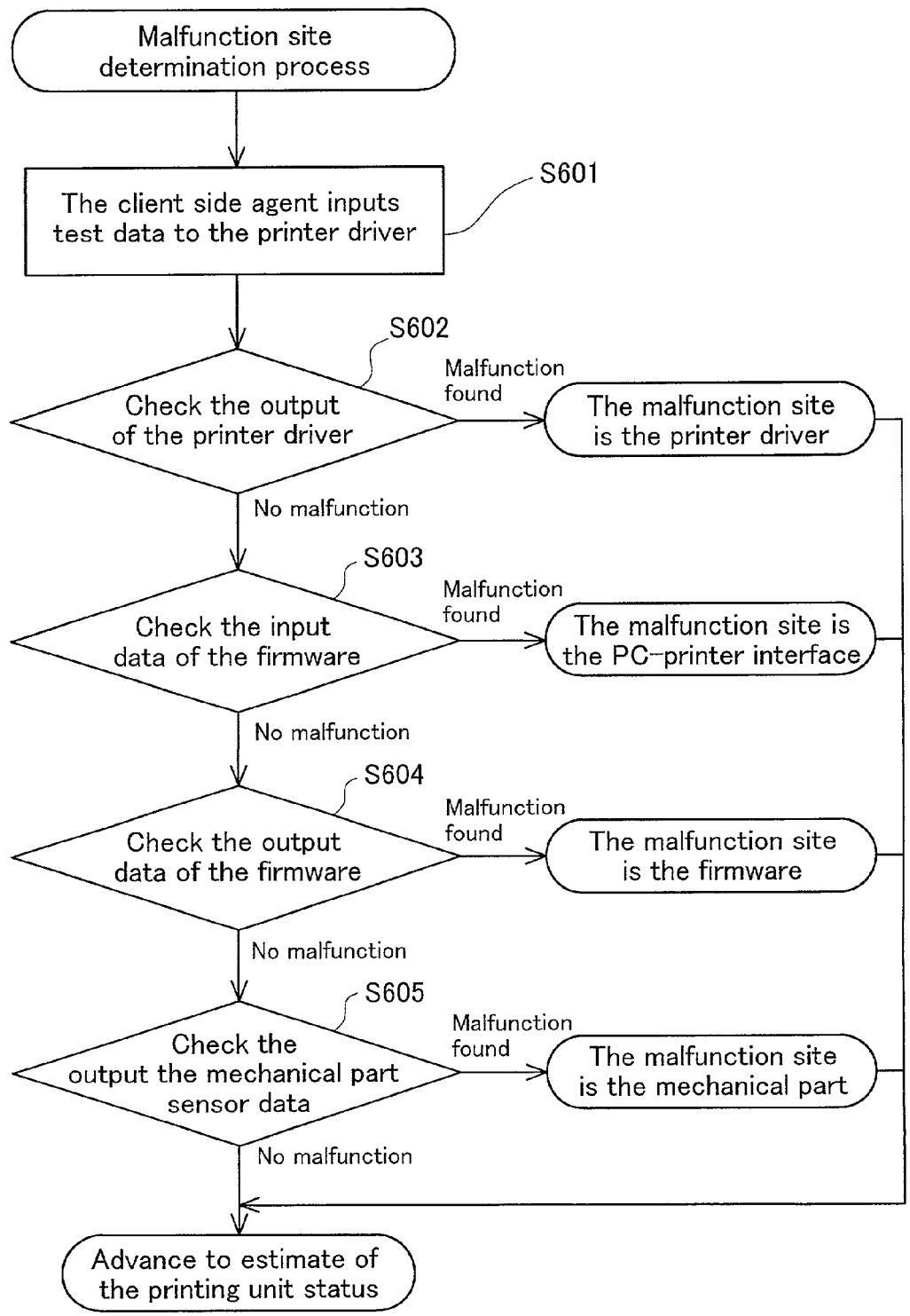
FIG. 16 is a flow chart that shows a procedure for the malfunction site specifying process for an embodiment of the present invention.

FIG. 16 is a flow chart that shows the procedure for the malfunction site specification process for an embodiment of the present invention. At step S601, for example, monitoring and control unit 201 of client side agent 200 inputs 100×100 RGB test data into printer driver 12. At step S602, a comparison is made between the printer driver 12 processing data and processing data of printer driver 12 at normal status. The printer driver 12 processing data at normal status is, for example, data obtained by client side agent 200 in advance when printer driver 12 was installed.

When both sets of process data match, then printer driver 12 is processing correctly. On the other hand, when a mismatch is seen in the process data, it is clear that printer driver 12 is not processing correctly. In other words, we know that there is an malfunction in the operation of printer driver 12.

At step S603, the input data of firmware 22 is checked. Checking of input data is to check the connection between computer 90 and printer 20. A possible method for this check can be, for example, transmitting output data of printer driver 12 to printer 20, buffering at printer 20, returning to computer 90, and comparing that data with output data of printer driver 12. By doing this, it becomes clear whether or not there is a problem with the connection between computer 90 and printer 20. It is also preferable that confirmation of control data performed between computer 90 and printer 20 be performed in the same manner. This is because when the problem of noise on the control signal occurs, for example, this can be specified.

At step S604, the operation of firmware 22 is checked. This check can be performed using the same method as the check of printer driver 21. At step S605, mechanical part 30 is checked. For this check, using the sensor equipped within the mechanical part, the presence of a paper jam, for example, can be checked. Application program 14 and operating system 11 can also be included as subjects of the malfunction site specifying process. When the malfunction site specifying process has ended, the process advances to step S504.

At step S504, an estimate is made of the status of printing unit 100. This status estimate is based on information obtained at steps S501 to S503, and is an estimate of the status of printing unit 100 from the perspective of, for example, (1) printer driver 12 interfering with other software,
(2) firmware 22 being damaged, and
(3) there being a problem with the connection between computer 90 and printer 20.

At step S505, a repair plan is generated. This repair plan regulates the process for changing from the estimated status of printing unit 100 to a normal status. For example, when printer driver 12 interferes with other specific software, the easiest repair method is to delete that software. When firmware 22 is damaged, if it is possible to reinstall firmware 22, that is the easiest repair method. Reinstallation of firmware 22 is possible if firmware 22 is stored in rewritable memory such as EEPROM. Also, when there is a problem with the connection between computer 90 and printer 20, possibilities are suggesting to the user to check whether or not there is any wobble in the connector or if there is a problem with the connection method.

For generation of the repair plan, when multiple diagnosis results and multiple repair methods are obtained, client side agent 200 makes proposals in sequence from the method that causes the least burden to the user. For example, when the probability of the estimate that printer driver 12 is interfering with other software is 40%, and the probability of the estimate that firmware 22 is damaged is 30%, considering only the estimate probability, deleting other software would be the first repair method proposal. However, in this case, the user cannot use that software. Meanwhile, there is virtually no burden on the user with reinstallation of firmware 22. Therefore, in this case, reinstallation of firmware 22 is the first repair plan.

Also, repair plans with first priority are software methods for which automatic repair can be done by the expert system, and repair plans with second priority are hardware repair method by the user, such as changing the connection method between computer 90 and printer 20, and finally sending out of a service person or recalling of the printer. By doing this, the probability of doing the repair with the least burden becomes higher.

At step S506, a judgment is made of whether the diagnosis results are determined. For this judgment, from the estimate probability and the repair burden, a comprehensive judgment is made by whether or not a valid solution method was found. For example, when the estimate probability is sufficiently high and the repair burden is sufficiently low, this is determined as diagnosis results presented to the user. Also, even when the estimate probability is somewhat small, if the repair burden is very low, then this is determined as the diagnosis result. On the other hand, even when the estimate probability is somewhat high, when the user burden is very high, for example, when recalling of the printer is diagnosed as necessary, a diagnosis result is not determined. When the diagnosis results are determined, the process advances to the malfunction resolution process by client side agent 200, and when the diagnosis result is not determined, the process advances to an malfunction diagnosis process by server side agent 220.

Figure 17:
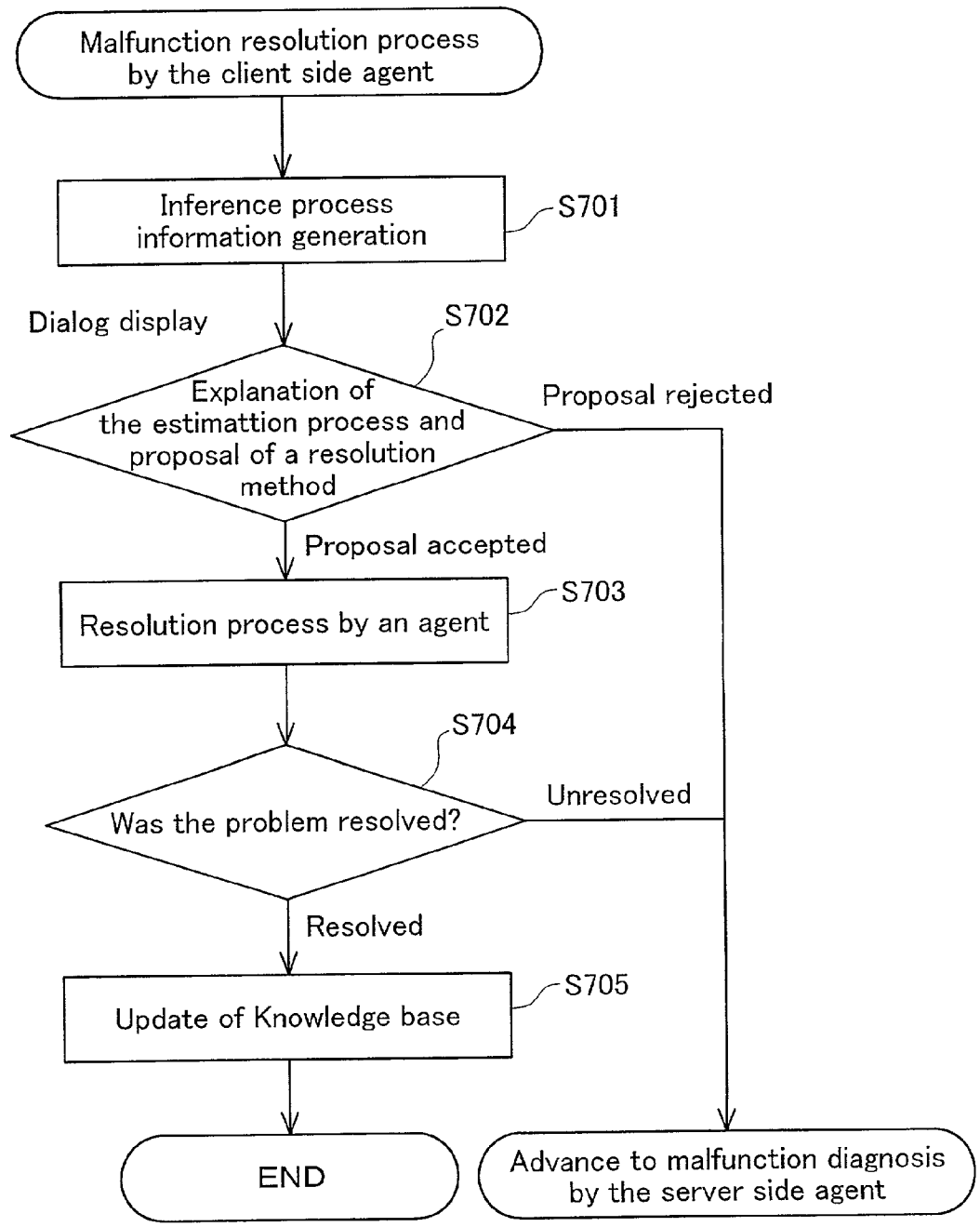
FIG. 17 is a flow chart that shows the procedure for the malfunction resolution process by the client side agent.

FIG. 17 is a flow chart that shows the procedure for the malfunction resolution process by the client side agent 200 for an embodiment of the present invention. At step S701, inference process explanation unit 213 generates information for the inference process. This information is data for explaining to the user the inference process for malfunction diagnosis, and is text data for example, and the user uses this for judging whether to accept or reject the diagnosis results and proposed repair plan by the expert system. When generation of this information is completed, the process advances to step S702, and an explanation is given for the proposed resolution method and the inference process.

Figure 18:
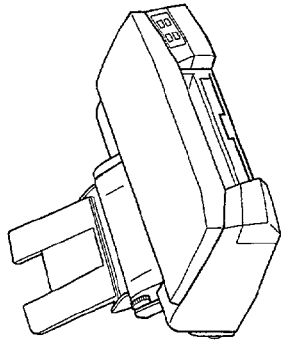
FIG. 18 is an explanatory diagram that shows an example of a dialog box that shows the diagnosis results by client side agent 200.

FIG. 18 is an explanatory diagram that shows an example of a dialog box that shows the diagnosis results by client side agent 200. This dialog box notifies the user of the diagnosis results for the malfunction, and also proposes a repair method for this to the user. Also, when "Confirm Estimate Process" is clicked, a screen is displayed that explains to the user the estimate process until the diagnosis results are reached. This screen will be described hereafter.

The user looks at the diagnosis results or if necessary looks at the estimate results, and judges whether the repair method is suitable or not. If the user judges it to be suitable and clicks "Yes," the process advances to step S703, and client side agent 200 repairs printing unit 100. On the other hand, if the user judges it not to be suitable and clicks "No," then another repair plan will be proposed. When the repair work by the agent is completed, the process advances to step S704. On the other hand, when all of the proposals by client side agent 200 are unacceptable, then the process moves to an malfunction diagnosis process in which server side agent 220 is involved.

We will give an explanation using steps S702 and S703 as a specific example. With this example, there are cases when diagnosis results are obtained whereby a certain software and printer driver 12 interfere. In this case, client side agent 200 displays a dialog box like that shown in FIG. 18, and requests acceptance of the proposed repair method. When the user accepts this, for example as with freeware installed for trial purposes, when the software is not important, if "Yes" is clicked, that software is deleted by monitoring and control unit 201 of client side agent 200.

At this time, by clicking "Confirm Estimate Process," the user can confirm the estimate process. This estimate process becomes a reference for whether a repair plan proposed by client side agent 200 is accepted by the user. On the other hand, when a user does not wish that software to be deleted, the user clicks "No." This leads to the presentation of a second repair plan. When there is no second repair plan, a connection is made to user support server system SV and diagnosis is done again including server side agent 220. Or, multiple diagnosis results and repair plans can be displayed simultaneously and the user can be made to select from these.

FIG. 19 is an explanatory diagram that shows an example of a dialog box that shows the estimate process by client side agent 200. This dialog box makes user judgment regarding whether or not to accept a repair proposal more accurate and easier. Also, as shown in FIG. 19, with this dialog box, it is preferable to have the user confirm symptoms that client side agent 200 can't perceive. This is because it makes it possible for the user to make a more accurate judgment. There are problems for which symptoms occur in the printing results, for example.

At step S704, the user confirms whether or not the problem was resolved using a dialog box (not illustrated). As a result, when the problem is resolved, the process advances to step S705, and when the problem is not resolved, the process advances to the malfunction diagnosis process by server side agent 220. At step S705, the knowledge base of client side agent 200 is updated. This update is to review the first estimate probability. In other words, when an malfunction is resolved, the estimated probability of the knowledge used for diagnosis is raised. The second is for recording that a specific malfunction was resolved and notifying the user the next time the same state occurs.

Figure 20:
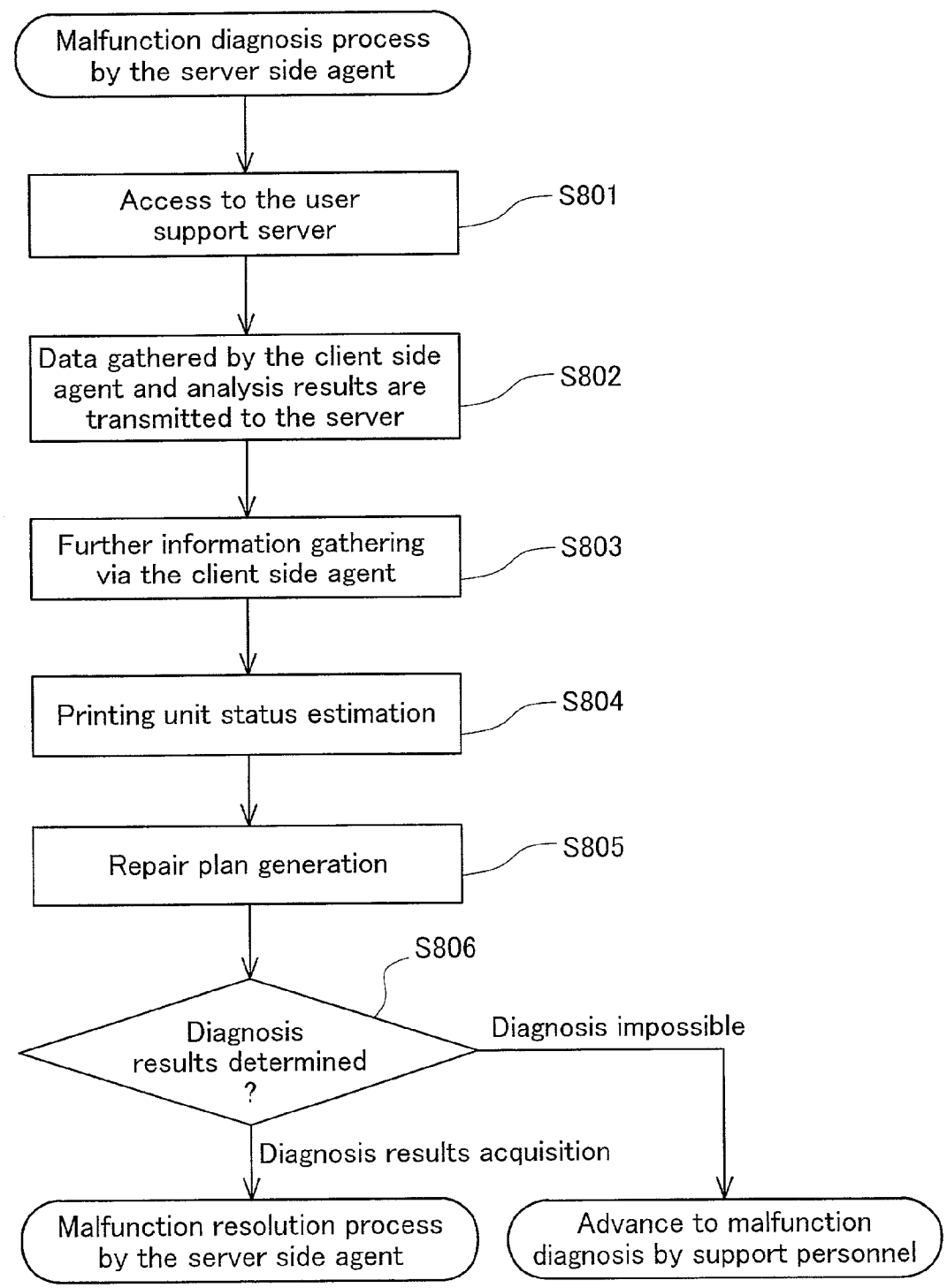
FIG. 20 is a flow chart that shows the procedure for the malfunction diagnosis process by server side agent 220.

FIG. 20 is a flow chart that shows the procedure of the malfunction diagnosis process by server side agent 220. At step S801, computer 90 accesses user support server system SV. This access is performed automatically by client side agent 200 after obtaining permission from the user. At this time, the user's permission is given using a dialog box (not illustrated).

At step S802, client side agent 200 transmits the gathered information and diagnosis results to user support server system SV. By doing this, server side agent 220 can obtain the information and diagnosis results obtained by client side agent 200. Server side agent 220 performs a diagnosis based on this information. Methods for performing this diagnosis include a diagnosis method whereby server side agent 220 performs independent diagnosis instead of client side agent 200, and a diagnosis method whereby server side agent 220 works in cooperation with client side agent 200. The latter is generally referred to as a multi-agent system.

For multi-agent systems, there is a contract net method whereby agents communicate with each other to share information, and a blackboard method whereby two agents share memory.

At step S803, further information gathering is performed via client side agent 200. This information gathering is performed when server side agent 220 determines that more information gathering is necessary for diagnosis. Information is gathered by server side agent 220 requesting information from client side agent 200 or by server side agent 220 directly controlling client side agent 200 as a slave agent.

At step S804, malfunction diagnostic expert system 230 of server side agent 220 uses knowledge base 232 to make a diagnosis based on the gathered information. It is also possible to instead have server side agent 220 cooperate with client side agent 200 to estimate the status of printing unit 100. At step S806, the diagnosis results are displayed on computer 90, and the process advances to malfunction resolution processing by server side agent 220. When it is judged that diagnosis is impossible, the process advances to malfunction diagnosis by the support personnel.

Figure 21:
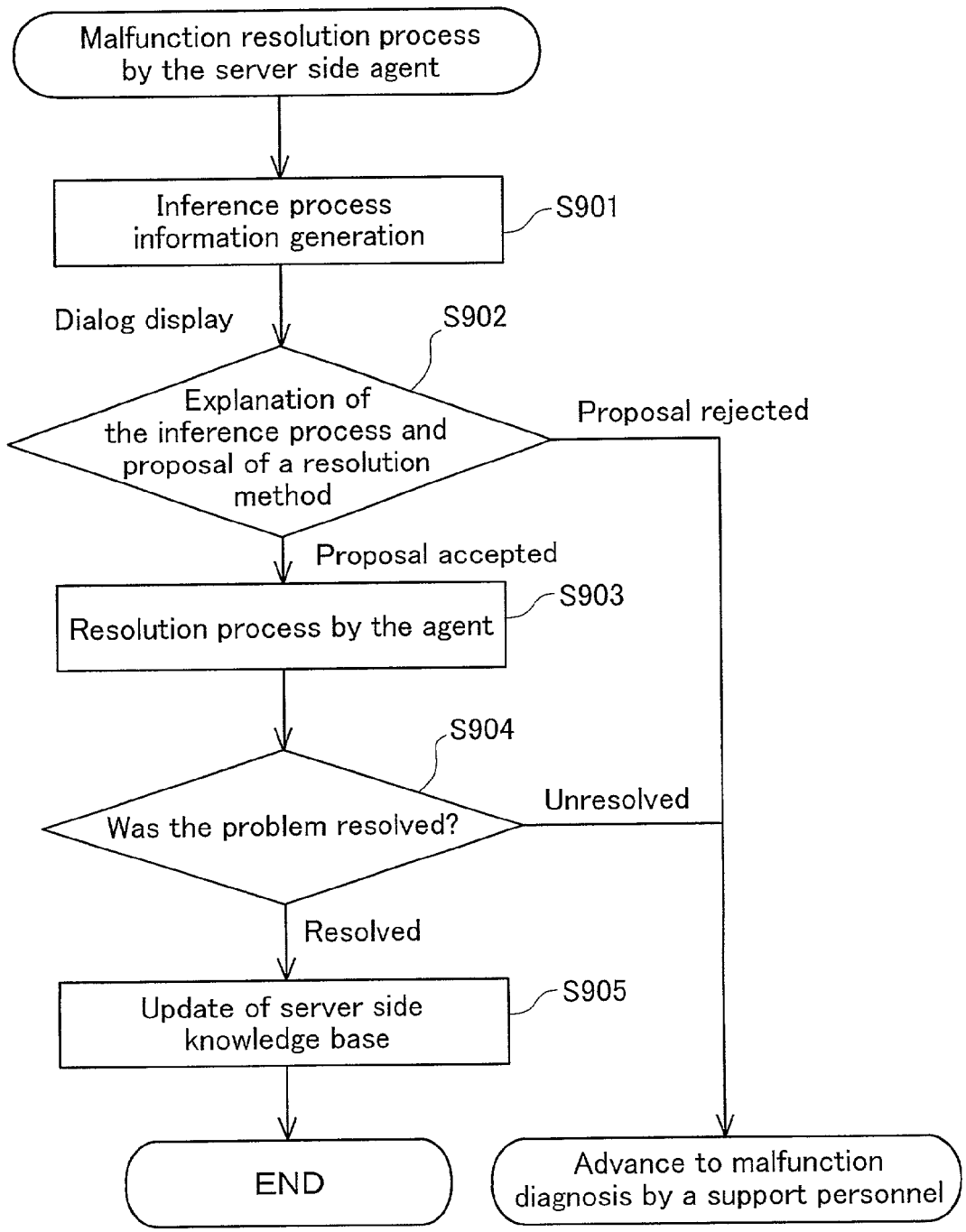
FIG. 21 is a flow chart that shows the procedure for the malfunction resolution process by server side agent 220.

FIG. 21 is a flow chart that shows the procedure of the malfunction resolution process by server side agent 220. Server side agent 220 can perform diagnosis and repair plans using the latest knowledge base 232. For example, when there is data in knowledge base 232 to the effect that the latest version of printer driver 12 will not cause the previously described software interference, it is possible to determine a diagnosis to the effect that the malfunction can be resolved by updating printer driver 12 to the latest version.

The procedure of the malfunction resolution process by server side agent 220 is about the same as the procedure for the malfunction resolution process by client side agent 200. However, there is a difference between the process after a proposal by server side agent 220 has been rejected and the process after the problem has been resolved (step S905). Specifically, when this kind of proposal is rejected, the support shifts to the support personnel. Also, after the problem is resolved, the server side knowledge base 232 is updated, but it is preferable that this update be done by support personnel who have confirmed the processes up to resolution, using rule editor 234 (FIG. 12) to make the update. It is also possible to make it possible to download part of the updated knowledge base to the user, depending on the device. At this time, the necessary knowledge base can be specified using the device ID.

Figure 22:
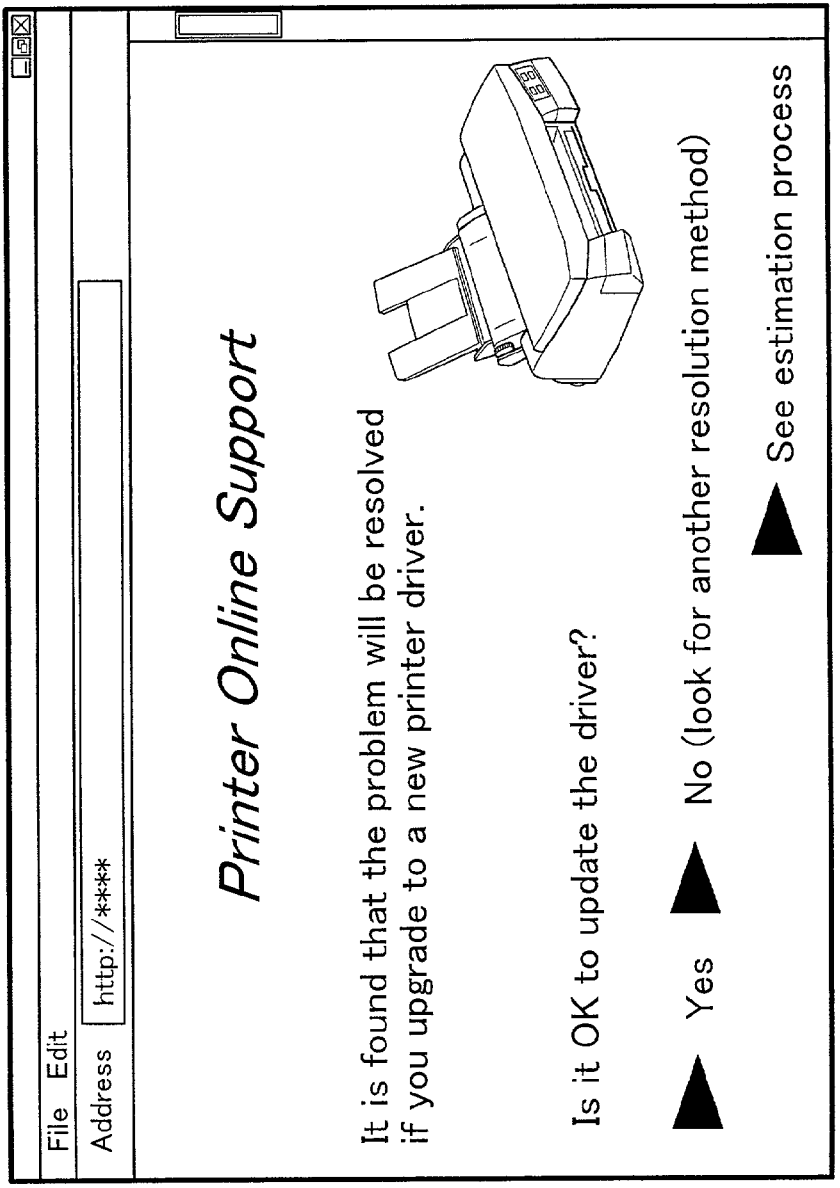
FIG. 22 is an explanatory diagram that shows an example of a dialog box that shows the diagnosis results by server side agent 220.

FIG. 22 is an explanatory diagram that shows an example of a dialog box that shows the results of diagnosis by server side agent 220. This dialog box asks the user whether or not to update to a new printer drive 12. When the user clicks "Yes," server side agent 220 uses the data of printer driver 12 in user support server system SV and automatically updates the printer driver 12 of computer 90. When the user clicks "No," a second repair plan is presented, and the process shifts to diagnosis by support personnel. At this time as well, when there are multiple repair plans, it is also possible to have multiple plans presented from the beginning.

When shifting to diagnosis by support personnel, FIGS. 7 through 9 are displayed, and processing is performed by the procedure of the first embodiment of the present invention (user support with support personnel as the central focus). However, as described previously, support personnel can perform diagnosis using information and diagnosis results gathered by client side agent 200 and server side agent 220.

When an malfunction is resolved by diagnosis by support personnel, the diagnosis results and information relating to the malfunction resolution method are put into database form so that other support personnel can also use the information, and the intelligence can also be updated. Specifically, using rule editor 234 (FIG. 12), it is preferable that server side knowledge base 232 be updated, and that client side knowledge base 212 can also be updated. By doing this, it is possible to use artificial intelligence to handle requests for the same kind of support, reducing redundant labor.

The support method with artificial intelligence as the central focus described above makes a drastic reduction in the support burden of the user, and also can reduce redundant labor on the part of support personnel.

D. Support Example

Following, we will explain a specific example of how a device malfunction is resolved for the embodiment described above. The first example is a case when computer 90 freezes when trying to print using a specific application program 14 (FIG. 1) in a Macintosh™ environment. The symptoms at this time are that application program 14 stops, a specified error message is displayed on the display and normal printing is not possible. This malfunction occurs under the following conditions.

(1) Operating system 11 is Macintosh™.
(2) Only occurs with specific application program 14.
(3) The settings of printer driver 12 are set to "Reduce page."

The most effective countermeasure for this example is to change the printer driver 12 setting from "Reduce page" to "Do not print outside the print area" or "Print the area outside the print area on a separate page."

For this example, user support with support personnel as a central focus is performed as follows. The support personnel obtains printing environment information and operating log information online, and this information includes the following.

(1) Operating system 11 is a Macintosh™.
(2) An error has occurred in the operation of specific application program 14.
(3) A specified error message has been output.
(4) The printer driver 12 setting is set to "Reduce page."

Therefore, it is possible to easily specify the cause of the malfunction. It is preferable to do this objectively by matching this specification with the shared database for support that is in the support center.

Support personnel who judge that the malfunction has been specified confirm the symptoms by e-mail or phone with the user, and then can propose changing the settings of printer driver 12 or some other effective method for avoiding the malfunction.

In this way, the support personnel can objectively and accurately obtain information easily without the user having to explain the malfunction status. By doing this, there is a significant reduction in the burden on both the user and support personnel, making smooth support possible.

Meanwhile, user support with artificial intelligence as the central focus is performed as follows. Client side agent 200 (FIG. 11) obtains printing environment information and operating log information within computer 90 through client side monitoring and control unit 201, and this information includes the following.

(1) Operating system 11 is a Macintosh™.
(2) An error has occurred in the operation of specific application program 14.
(3) A specified error message has been output.
(4) The printer driver 12 setting is set to "Reduce page."

From the printing environment information and operating log information, we can see that the condition for generating a nonconformity are met and the probability of this is 80%. This is because the conditions for this malfunction occurring and the fact that those conditions have been met, as well as the malfunction occurrence probability (80%) and the symptoms when the malfunction occurred are input to knowledge base 212 that has the malfunction diagnostic expert system of client side agent 200.

Next, with malfunction site specification processing (FIG. 16), a confirmation is made of whether there is an malfunction in printer driver 12, etc. itself. If there is no malfunction in printer driver 12, etc. itself, it is possible to estimate that there is a 50% probability that there is a problem in the application program 14 itself or in the compatibility between application program 14 and printer driver 12.

From the above analysis, it is possible to automatically estimate that the printing unit 100 status is the aforementioned malfunction at an estimate probability of 90%. Based on this estimate, a procedure for repairing the printing unit 100 to be normal is developed. When the development of this repair plan is completed, a dialog box (FIG. 23) that notifies the user of the diagnosis results and proposes a repair method is displayed.

FIG. 23 is an explanatory diagram that shows an example of a dialog box that shows the diagnosis results. By looking at this dialog box, the user can know the cause of the malfunction and an overview of the repair method. Based on this information, the user can judge whether or not to permit repairs by client side agent 200. When the user decides to allow the repair to be done by client side agent 200 using only the presented information, he clicks "Yes." When the user wants to confirm the estimate process, he clicks "Confirm estimate status." On the other hand, when the user does not consent to this repair, he clicks "No."

FIG. 24 is an explanatory diagram that shows an example of a dialog box that shows the estimate process up until the diagnosis results are reached. This dialog box can spread across multiple pages. It is also possible to display the estimate probability of each judgment criterion that is a factor in the decision. Also, it is preferable to make the decision by the user easier by displaying symptoms that the user can perceive from the diagnosed malfunction.

When the difference between each probability is small when multiple malfunction are estimated as a result of diagnosis by client side agent 200, the process can advance to a status estimate by the user interacting with this screen. For example, it is possible to advance the estimate by explaining to the user the symptoms that accompanied each estimated status, and by having the user selectively reply whether or not that is applicable. By doing this, a high precision estimate is possible.

Figure 25:
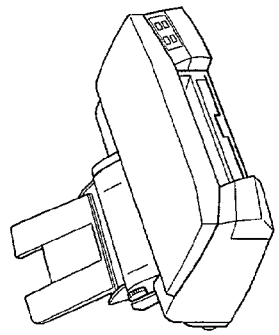
FIG. 25 is an explanatory diagram that shows an example of a dialog box that shows multiple repair methods.

FIG. 25 is an explanatory diagram that shows an example of a dialog box that shows multiple repair methods. For this example, there is leeway in the selection for the repair method, so multiple repair methods are proposed. The user selects the repair method he wants from these, and clicks. When this is done, client side agent 200 uses its monitoring and control unit 201 to repair automatically.

As described above, there is a significant reduction in the burden on the user side when an malfunction occurs by having client side agent 200 and server side agent 220 perform diagnosis and repairs automatically. Also, there is a reduction in redundant labor for user support by automating part of the user support, making smooth operation possible.

E. Prior Provision of New Technology

Figure 26:
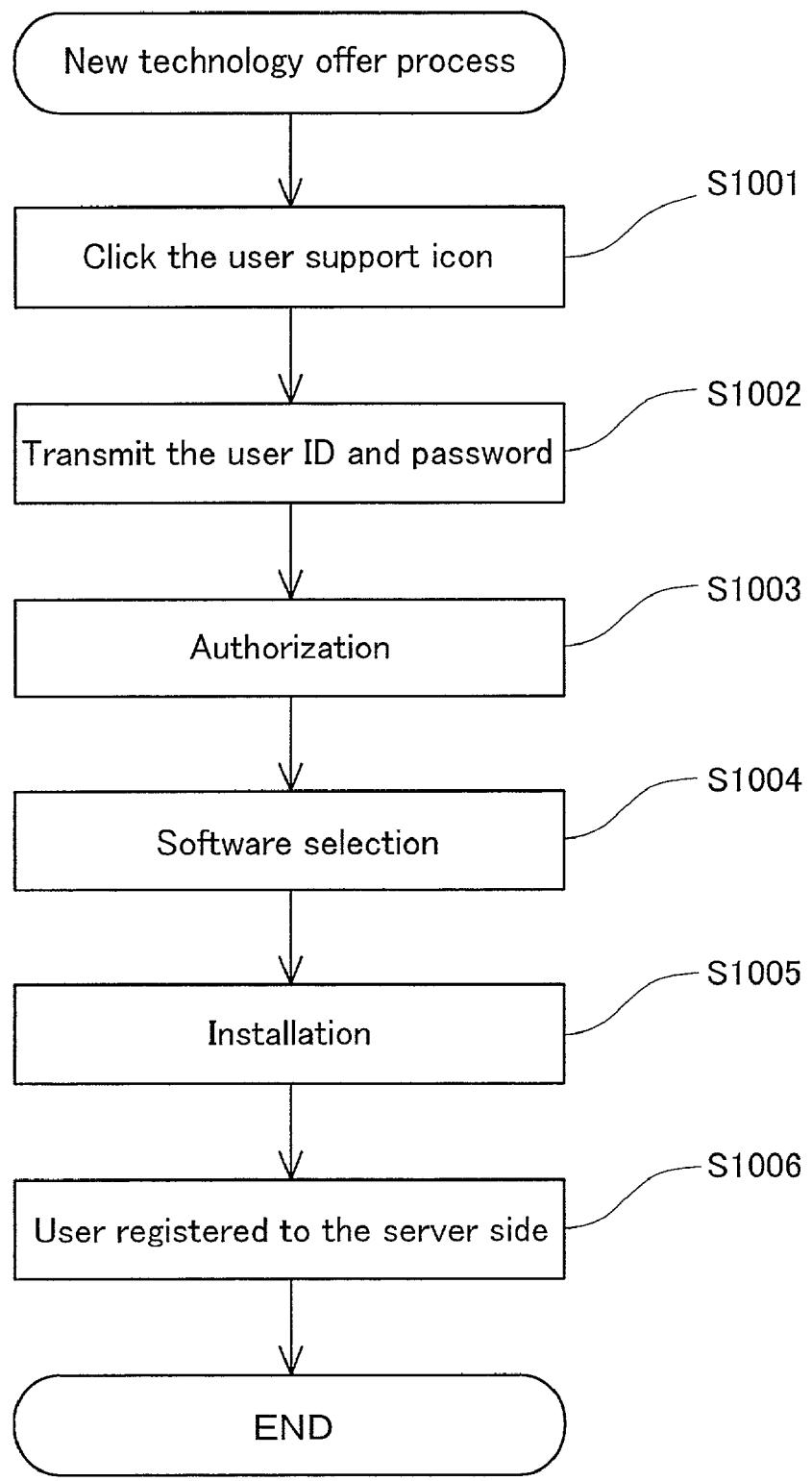
FIG. 26 is a flow chart that shows the procedure for priority provision of new technology for an embodiment of the present invention.
Figure 27:
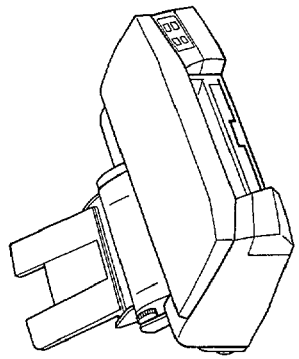
FIG. 27 is an explanatory diagram that shows an example of a dialog box that asks the user for the contents of the support desired.

FIG. 26 is a flow chart that shows the procedure for priority provision of new technology for an embodiment of the present invention. FIG. 27 is an explanatory diagram that shows an example of a dialog box that asks the user about the contents of the supporthe desires. This process, as with the beta version distribution of printer driver 12, for example, is a process for distributing a priority version of software for which quality is not guaranteed to a specified user only. This process is done by the following procedure.

At step S1001, the user clicks a user support icon. By doing this, a dialog box with which the user is asked the contents of the supporthe desires is displayed on the display of computer 90. When the user clicks "Try new technology," the process advances to step S1002.

At step S1002, computer 90 is connected to user support server system SV via the internet. At step S1003, authorization is done. This authorization is done by transmitting a user ID, printer ID, and a password obtained by the client system at user registration and having the user support server confirm this.

At step S1004, the user selects software. This selection can be made, for example, by the user clicking the software he wants to try from software listed up in a dialog box (not illustrated). At step S1005, the selected software is installed in computer 90 which is connected to printer 20. This installation is done directly by user support server system SV to computer 90. Also, the installed software is compiled after revision of the source code so that it operates only on that printer, for example. By doing this, this software operates only on the computer 90 on which it is installed.

When install is completed normally, that fact is transmitted to the user support server, and the user ID and printer ID of that user are registered. At that time, it is preferable that the printing environment information be automatically uploaded to the user support server system SV.

Provision of new technology can be limited to registered users by the above procedure, and it is possible to prevent the harmful effect of spreading due to redistribution of software for which quality is not guaranteed.

F. Variation Example

The present invention is not limited to the aforementioned working examples and embodiments, and many variations can be implemented within a scope that does not stray from the gist of the invention, with a variation such as the following as an example.

When part or all of the functions of the present invention are realized using software, this software (computer program) can be provided in a form stored on a recording medium that can be read using a computer. For the present invention, a "computer-readable recording medium" is not limited to a recording medium in a portable format such as a floppy disk or CD-ROM, but can also be contained in an internal memory device within a computer such as various types of RAM and ROM, or in an external recording device fixed to a computer such as a hard disk.

What is claimed is:

1. A user support method of providing online support for operation of a printing device coupled to a client system, comprising steps of:
   (a) connecting the client system to a user support server system configured to provide online support for operation of the printing device;
   (b) transmitting device information indicative of a device model and environment information indicative of an operation environment of the printing device, from the client system to the user support server system;
   (c) generating device support information using the device information and the environment information transmitted to the user support server system, the device support information being configured to be used for supporting operation of the printing device;
   (d) transmitting the device support information from the user support server system to the client system; and
   (e) displaying the device support information on the client system, wherein
   the step (b) includes a step of generating device malfunction information by the client system, used to diagnose malfunction of the printing device, and wherein
   the malfunction information includes information relating to printing done in the past by the printing device, and wherein
   step (c) includes generating a repair plan for solving malfunction of the printing device, the repair plan comprising at least one repair method; and
   step (e) includes making proposals in sequence from the repair method that causes the least burden to a user of the printing device, when multiple diagnosis results and multiple repair methods are obtained in step (c).

2. The user support method of claim 1, wherein
   the client system obtains a user ID and a password for receiving permission for access to the user support server system before the step (a), and
   the step (a) includes a step of connecting the client system to the user support server with the user ID and the password.

3. The user support method of claim 1, wherein
   the device support information includes malfunction solution information configured to be used to solve malfunction of the printing device.

4. The user support method of claim 3, wherein the step (b) includes a step of:
   transmitting the device malfunction information to the user support server system.

5. The user support method of claim 4, further comprising steps of:
   trying to generate the device malfunction solution information by the client system using the device information and the operation environment information stored in advance in the client system before the step (a),
   halting the steps (a) through (d) if the generation of the device malfunction solution information is successful, and
   executing the steps (a) through (d) if the generation of the device malfunction solution information is not successful.

6. The user support method of claim 3, wherein
   the step (c) includes a step of generating the device malfunction solution information with the information transmitted to the user support server system.

7. The user support method of claim 3, wherein
   the step (c) includes a step of solving malfunction of the printing device with the device malfunction solution information under a control of the user support server system.

8. A user support method of providing offline support for operation of a printing device on a computer connected to the printing device, comprising steps of:
   (a) generating device support information using device information indicative of a device model and environment information indicative of an operation environment of the printing device, the device support information being configured to be used for supporting operation of the printing device;

(b) displaying the device support information on the computer;

(c) generating device malfunction information by the computer, used to diagnose malfunction of the printing device, wherein the malfunction information includes information relating to printing done in the past by the printing device, and wherein step (a) includes generating a repair plan for solving malfunction of the printing device, the repair plan comprising at least one repair method; and step (b) includes making proposals in sequence from the repair method that causes the least burden to a user of the printing device, when multiple diagnosis results and multiple repair methods are obtained in step (a).

9. The user support method of claim 8, wherein the device support information includes device malfunction solution information used to solve malfunction of the device.

10. The user support method of claim 9, further comprising a step of solving malfunction of the device with the device malfunction solution information.

11. A user support method of providing online support for operation of a printing device coupled to a client system, comprising steps of:

under a control of a user support server system (a) transmitting device information indicative of a device model and environment information indicative of an operation environment of the printing device, from the client system;

(b) generating device support information using the device information and the environment information transmitted to the user support server system, the device support information being configured to be used for supporting operation of the printing device;

(c) transmitting the device support information from the user support server system to the client system; and (d) displaying the device support information on the client system under a control of the user support server system, wherein the step (a) includes a step of generating device malfunction information by the client system, used to diagnose malfunction of the printing device, and wherein the malfunction information includes information relating to printing done in the past by the printing device, and wherein step (b) includes generating a repair plan for solving malfunction of the printing device, the repair plan comprising at least one repair method; and step (d) includes making proposals in sequence from the repair method that causes the least burden to a user of the printing device, when multiple diagnosis results and multiple repair methods are obtained in step (b).

12. The user support method of claim 11, wherein the device support information includes malfunction solution information configured to be used to solve malfunction of the printing device.

13. The user support method of claim 12, wherein the step (b) includes a step of generating the device malfunction solution information with the information transmitted to the user support server system.

14. The user support method of claim 12, wherein the step (b) includes a step of solving malfunction of the printing device with the device malfunction solution information under a control of the user support server system.

15. A method of receiving online support for operation of a printing device coupled to a client system, comprising steps of:

(a) connecting the client system to a user support server system configured to provide online support for operation of the printing device;

(b) transmitting device information indicative of a device model and environment information indicative of an operation environment of the printing device, from the client system to the user support server system;

(c) receiving device support information using the device information and the environment information transmitted to the user support server system, the device support information being configured to be used for supporting operation of the printing device; and (d) displaying the device support information on the client system, wherein the step (b) includes a step of generating device malfunction information by the client system, used to diagnose malfunction of the printing device, wherein the malfunction information includes information relating to printing done in the past by the printing device, and wherein step (c) includes generating a repair plan for solving malfunction of the printing device, the repair plan comprising at least one repair method; and step (d) includes making proposals in sequence from the repair method that causes the least burden to a user of the printing device, when multiple diagnosis results and multiple repair methods are obtained in step (c).

16. The method of claim 15, wherein the client system obtains a user ID and a password for receiving permission for access to the user support server system before the step (a), and the step (a) includes a step of connecting the client system to the user support server system with the user ID and the password.

17. The method of claim 15, wherein the device support information includes malfunction solution information configured to be used to solve malfunction of the printing device.

18. The method of claim 17, wherein the step (b) includes a step of:

transmitting the printing device malfunction information to the user support server system.

19. The method of claim 18, further comprising steps of:

trying to generate the device malfunction solution information using the device information and the operation environment information in the client system before the step (a), halting the steps (a) through (c) if the generation of the device malfunction solution information is successful, and executing the steps (a) through (c) if the generation of the device malfunction solution information is not successful.

20. A user support server system of providing online support for operation of a printing device coupled to a client system, comprising:

a first information receiver configured to receive device information indicative of a device model and environment information indicative of an operation environment of the printing device, from the client system;

an information generator configured to generate device support information using the device information and the environment information transmitted to the user support server system, the device support information being configured to be used for supporting operation of the printing device;

an information transmitter configured to transmit the device support information to the client system;

a display controller configured to display the device support information on the client system under a control of the user support server system; and a second information receiver configured to receive device malfunction information generated by the client system, used to diagnose malfunction of the printing device, wherein the malfunction information includes information relating to printing done in the past by the printing device, and wherein the information generator is configured to generate a repair plan for solving malfunction of the printing device, the repair plan comprising at least one repair method; and the display controller is configured to make proposals in sequence from the repair method that causes the least burden to a user of the printing device, when multiple diagnosis results and multiple repair methods are obtained by the information generator.

21. The user support server system of claim 20, wherein the device support information includes malfunction solution information configured to be used to solve malfunction of the printing device.

22. The user support server system of claim 21, wherein the information generator configured to generate the device malfunction solution information with the information transmitted to the user support server system.

23. The user support server system of claim 21, wherein the information generator solves malfunction of the printing device with the device malfunction solution information under a control of the user support server system.

24. A client system of receiving online support for operation of a printing device coupled to the client system, comprising:

a connector configured to connect the client system to a user support server system configured to provide online support for operation of the printing device;

an information transmitter configured to transmit device information indicative of a device model and environment information indicative of an operation environment of the printing device, from the client system to the user support server system;

an information receiver configured to receive device support information using the device information and the environment information transmitted to the user support server system, the device support information being configured to be used for supporting operation of the printing device; and a display controller configured to display the device support information on the client system; wherein the information transmitter is further configured to generate device malfunction information by the client system, used to diagnose malfunction of the printing device, wherein the malfunction information includes information relating to printing done in the past by the printing device, and wherein the information receiver is configured to generate a repair plan for solving malfunction of the printing device, the repair plan comprising at least one repair method; and the display controller is configured to make proposals in sequence from the repair method that causes the least burden to a user of the printing device, when multiple diagnosis results and multiple repair methods are obtained by the information receiver.

25. The client system of claim 24, wherein the client system obtains a user ID and a password for receiving permission for access to the user support server system, and the connector connects the client system to the user support server system with the user ID and the password.

26. The client system of claim 24, wherein the device support information includes malfunction solution information configured to be used to solve malfunction of the printing device.

27. The client system of claim 26, wherein the information transmitter generates device malfunction information being configured to be used to diagnose malfunction of the printing device, and also transmits the device malfunction information to the user support server system.

28. The client system of claim 27, further comprising:

a solution generator configured to try to generate the device malfunction solution information using the device information and the operation environment information in the client system before the step (a), and a process controller configured to halt the process if the generation of the device malfunction solution information is successful, or to proceed if the generation of the device malfunction solution information is not successful.

29. A computer system of providing offline support for operation of a printing device coupled to the computer, comprising:

a device support information generator configured to generate device support information using device information indicative of a device model and environment information indicative of an operation environment of the printing device, the device support information being configured to be used for supporting operation of the printing device;

a display controller configured to display the device support information on the computer; and a device malfunction information generator configured to generate device malfunction information used to diagnose malfunction of the printing device, wherein the malfunction information includes information relating to printing done in the past by the printing device, and wherein the device support information generator is configured to generate a repair plan for solving malfunction of the printing device, the repair plan comprising at least one repair method; and the display controller is configured to make proposals in sequence from the repair method that causes the least burden to a user of the printing device, when multiple diagnosis results and multiple repair methods are obtained by the device support information generator.

30. The computer system of claim 29, wherein the device support information includes device malfunction solution information used to solve malfunction of the printing device.

31. The computer system of claim 30, further comprising a solver configured to solve malfunction of the printing device with the device malfunction solution information.

32. A computer program product for causing a computer to provide online support for operation of a printing device coupled to another computer, the computer program product comprising:
a computer readable medium; and
a computer program stored on the computer readable medium, the computer program comprising:
a program for causing the computer to receive device information indicative of a device model and environment information indicative of an operation environment of the printing device from the other computer;
a program for causing the computer to generate device support information using the device information and the environment information transmitted to the computer, the device support information being configured to be used for supporting operation of the printing device;
a program for causing the computer to transmit the device support information to the other computer;
a program for causing the other computer to display the device support information on the other computer, and
a program for causing the computer to generate device malfunction information used to diagnose malfunction of the printing device, wherein
the malfunction information includes information relating to printing done in the past by the printing device, and wherein
the program for causing the computer to generate device support information includes a program for causing the computer to generate a repair plan for solving malfunction of the printing device, the repair plan comprising at least one repair method; and
the program for causing the other computer to display the device support information includes a program for causing the other computer to make proposals in sequence from the repair method that causes the least burden to a user of the printing device, when multiple diagnosis results and multiple repair methods are obtained by the program for causing the computer to generate device support information.

33. A computer program product for causing a computer to receive online support for operation of a printing device coupled to the computer, the computer program product comprising:
a computer readable medium; and
a computer program stored on the computer readable medium, the computer program comprising:
a program for causing the computer to connect the computer to another computer configured to provide online support for operation of the printing device;
a program for causing the computer to transmit device information indicative of a device model and environment information indicative of an operation environment of the printing device from the computer to the other computer;
a program for causing the computer to receive device support information using the device information and the environment information transmitted to a user support server system, the device support information being configured to be used for supporting operation of the printing device;
a program for causing the other computer to displaying the device support information on the other computer, and
a program for causing the computer to generate device malfunction information used to diagnose malfunction of the printing device, wherein
the malfunction information includes information relating to printing done in the past by the printing device, and wherein
the program for causing the computer to receive device support information includes a program for causing the computer to generate a repair plan for solving malfunction of the printing device, the repair plan comprising at least one repair method; and
the program for causing the other computer to display the device support information includes a program for causing the other computer to make proposals in sequence from the repair method that causes the least burden to a user of the printing device, when multiple diagnosis results and multiple repair methods are obtained by the program for causing the computer to receive device support information.

34. A computer program product for causing the computer to provide offline support for operation of a printing device coupled to the computer, the computer program product comprising:
a computer readable medium; and
a computer program stored on the computer readable medium, the computer program comprising:
a program for causing the computer to generate device support information using device information indicative of a device model and environment information indicative of an operation environment of the printing device, the device support information being configured to be used for supporting operation of the printing device;
a program for causing the computer to display the device support information on the computer, and
a program for causing the computer to generate device malfunction information used to diagnose malfunction of the printing device, wherein
the malfunction information includes information relating to printing done in the past by the printing device, and wherein
the program for causing the computer to generate device support information includes a program for causing the computer to generate a repair plan for solving malfunction of the printing device, the repair plan comprising at least one repair method; and
the program for causing the computer to display the device support information includes a program for causing the computer to make proposals in sequence from the repair method that causes the least burden to a user of the printing device, when multiple diagnosis results and multiple repair methods are obtained by the program for causing the computer to generate device support information.

* * * * *